US010966110B2

(12) United States Patent
Takano

(10) Patent No.: US 10,966,110 B2
(45) Date of Patent: Mar. 30, 2021

(54) TERMINAL APPARATUS, BASE STATION, METHOD AND RECORDING MEDIUM

(71) Applicant: Sony Corporation, Tokyo (JP)

(72) Inventor: Hiroaki Takano, Saitama (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/314,664

(22) PCT Filed: Jun. 14, 2017

(86) PCT No.: PCT/JP2017/021891
§ 371 (c)(1),
(2) Date: Jan. 1, 2019

(87) PCT Pub. No.: WO2018/020881
PCT Pub. Date: Feb. 1, 2018

(65) Prior Publication Data
US 2019/0320336 A1 Oct. 17, 2019

(30) Foreign Application Priority Data
Jul. 29, 2016 (JP) .............................. JP2016-150169

(51) Int. Cl.
H04W 24/10 (2009.01)
H04L 5/00 (2006.01)
H04W 16/28 (2009.01)

(52) U.S. Cl.
CPC ........... H04W 24/10 (2013.01); H04L 5/0048 (2013.01); H04W 16/28 (2013.01)

(58) Field of Classification Search
CPC ........ H04W 24/10; H04W 16/28; H04L 5/00; H04L 5/0048
See application file for complete search history.

(56) References Cited

U.S. PATENT DOCUMENTS
2013/0172002 A1 7/2013 Yu et al.
2014/0211731 A1 7/2014 Inoue
(Continued)

FOREIGN PATENT DOCUMENTS
EP 3 122 094 A1 1/2017
JP 2014-624705 A 9/2014
(Continued)

OTHER PUBLICATIONS

Extended Search Report issued in European Application 17833891.9-1215 dated Jun. 3, 2019.
(Continued)

Primary Examiner — Kyaw Z Soe
(74) Attorney, Agent, or Firm — Xsensus LLP

(57) ABSTRACT

[Object] To provide a mechanism that can improve the continuity of beam tracking.
[Solution] A terminal apparatus, including: a communication unit configured to perform communication with a base station configured to form a plurality of beams and perform communication; and a control unit configured to report first report information for downlink user data related to reception results of a group of downlink reference signals including a plurality of downlink reference signals transmitted from the base station using the beams and second report information for beam tracking intended for the terminal apparatus by the base station to the base station.

19 Claims, 20 Drawing Sheets

(56) References Cited

U.S. PATENT DOCUMENTS

| | | | |
|---|---|---|---|
| 2015/0382205 A1* | 12/2015 | Lee | H04L 5/0048 |
| | | | 370/329 |
| 2016/0099763 A1* | 4/2016 | Chen | H04B 7/063 |
| | | | 370/329 |
| 2016/0219570 A1 | 7/2016 | Guo et al. | |
| 2016/0345216 A1* | 11/2016 | Kishiyama | H04L 5/005 |
| 2017/0026962 A1* | 1/2017 | Liu | H04W 74/0833 |
| 2017/0094531 A1* | 3/2017 | Kakishima | H04W 24/10 |

FOREIGN PATENT DOCUMENTS

| | | | |
|---|---|---|---|
| JP | 2015-164281 A | 9/2015 | |
| JP | 2015-185952 A | 10/2015 | |
| JP | 2015-216449 A | 12/2015 | |
| JP | 2016-514406 A | 5/2016 | |
| WO | 2015/115376 A1 | 8/2015 | |
| WO | 2015/141065 A1 | 9/2015 | |

OTHER PUBLICATIONS

English translation of International Search Report and Written Opinion for International Application No. PCT/JP2017/021891, dated Aug. 29, 2017.
Office Action dated Jul. 10, 2020 in Russian Patent Application No. 2019101603/07(002740), 20 pages.
Japanese Office Action dated Oct. 27, 2020, in corresponding Japanese Patent Application No. 2019-218942.
Office Action dated Nov. 26, 2020 in Taiwanese Patent Application No. 106124164, 10 pages.

\* cited by examiner

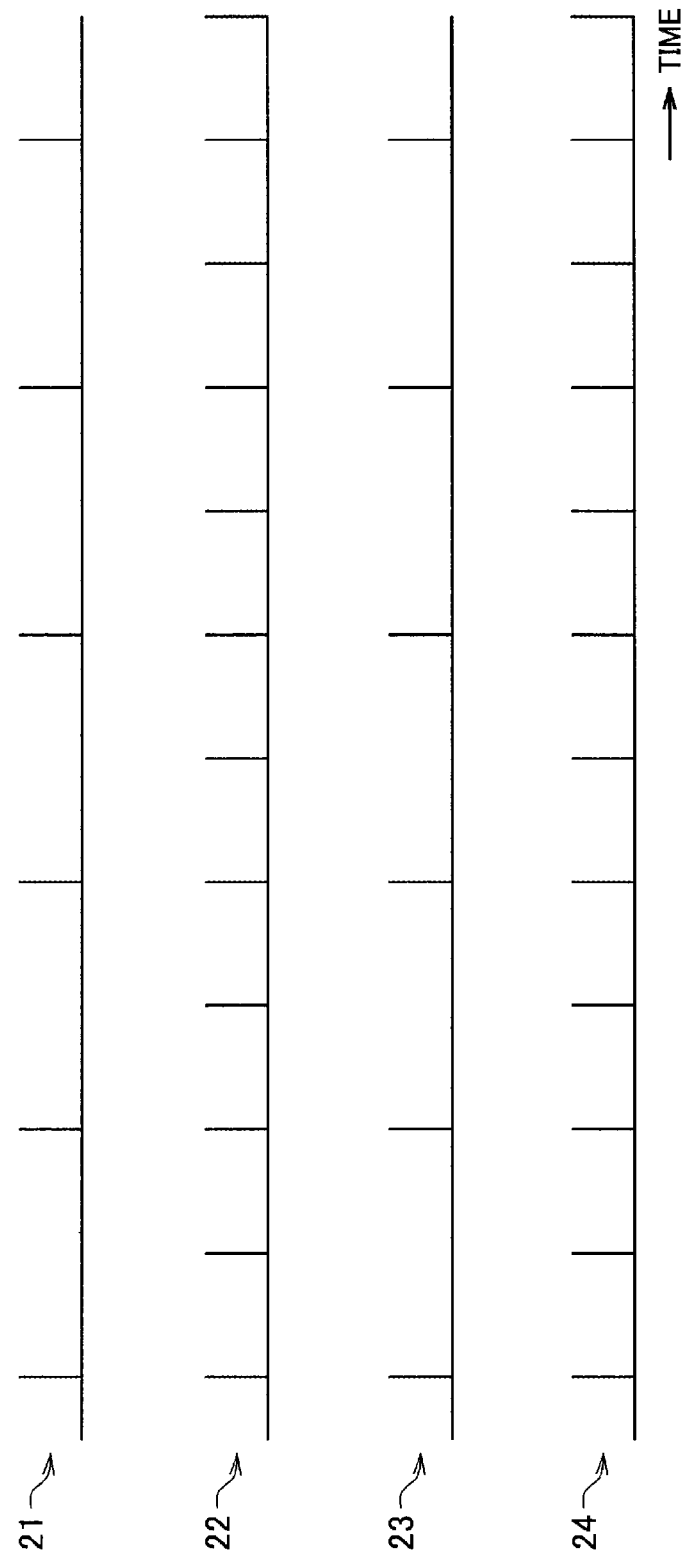

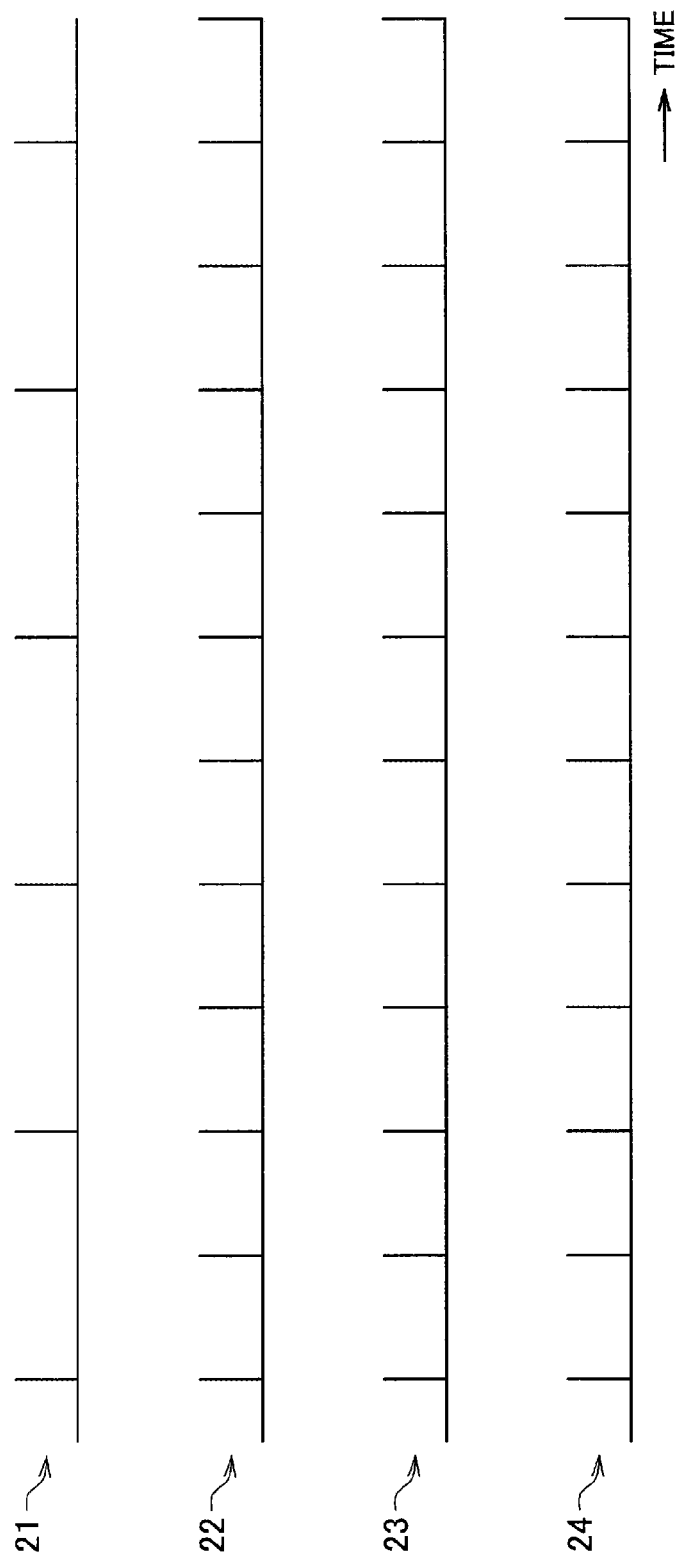

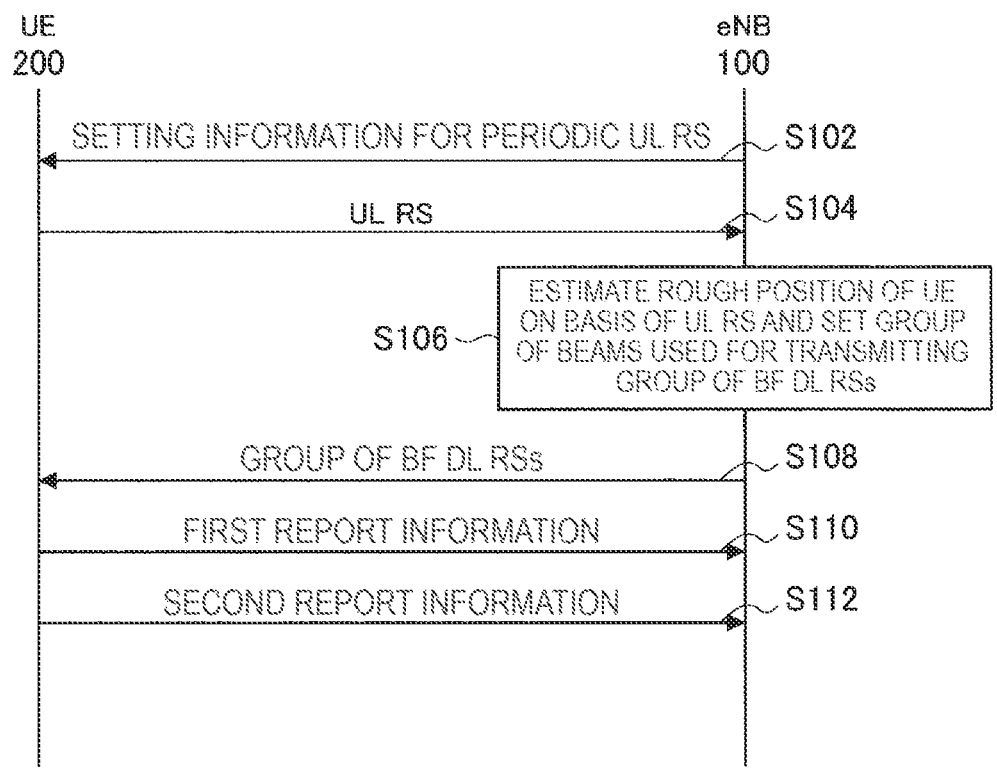
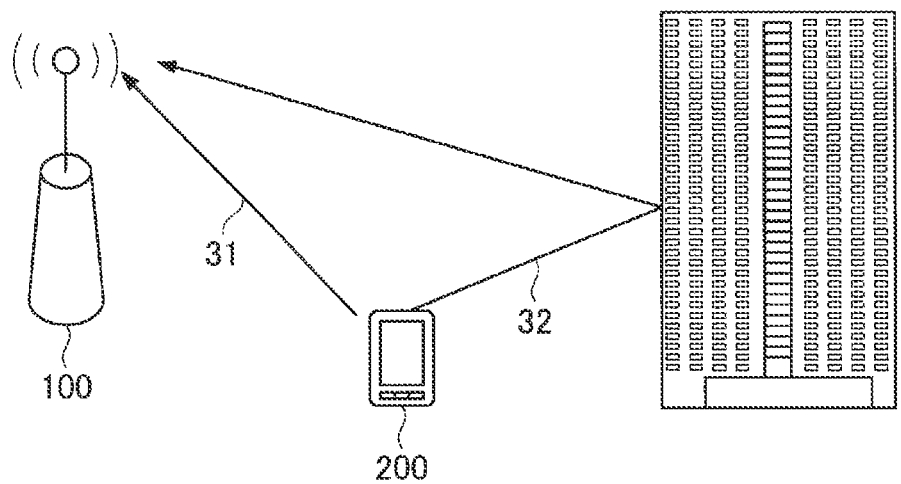

TERMINAL APPARATUS, BASE STATION, METHOD AND RECORDING MEDIUM

CROSS-REFERENCE TO RELATED APPLICATIONS

This application is a National Stage Application based on PCT/JP2017/021891, filed on 14 Jun. 2017, and claims priority to Japanese Patent Application No. 2016-150169, filed on 29 Jul. 2016, the entire contents of which being incorporated herein by reference.

TECHNICAL FIELD

The present disclosure relates to a terminal apparatus, a base station, a method and a recording medium.

BACKGROUND ART

In recent years, 5G which is a next generation communication standard has been discussed in the Third Generation Partnership Project (3GPP). Communication technology constituting 5G is also called New Radio Access Technology (NR).

One of the study items of 3GPP Release 14 is multiple-input and multiple-output (MIMO) for NR. MIMO is a technique for performing beam forming using a plurality of antennas, and includes 3D (or full dimension)-MIMO capable of performing beam forming in three-dimensional directions massive-MIMO using a plurality of antennas, and the like. Improvement in the accuracy of a beam tracking technique for continuously providing appropriate beams to a user terminal is required in MIMO.

For example, a technique for deciding beams for a user apparatus on the basis of feedback information from a user apparatus for beam forming is disclosed in the following Patent Literature 1.

CITATION LIST

Patent Literature

Patent Literature 1: JP 2015-164281A

DISCLOSURE OF INVENTION

Technical Problem

However, techniques related to beam tracking such as that proposed in Patent Literature are still under discussion, and it is difficult to say that sufficient proposals have been made. For example, a technique for improving continuity of beam tracking is also a technique that has not been sufficiently proposed.

Solution to Problem

According to the present disclosure, there is provided a terminal apparatus, including: a communication unit configured to perform communication with a base station configured to form a plurality of beams and perform communication; and a control unit configured to report first report information for downlink user data related to reception results of a group of downlink reference signals including a plurality of downlink reference signals transmitted from the base station using the beams and second report information for beam tracking intended for the terminal apparatus by the base station to the base station.

In addition, according to the present disclosure, there is provided a base station, including: a communication unit configured to form a plurality of beams and perform communication with a terminal apparatus; and a control unit configured to perform transmission of a group of downlink reference signals including a plurality of downlink reference signals transmitted using beams to the terminal apparatus, reception of first report information for downlink user data related to reception results of the group of downlink reference signals and second report information for beam tracking intended for the terminal apparatus from the terminal apparatus, a first transmission setting based on the first report information, and a second transmission setting based on the second report information.

In addition, according to the present disclosure, there is provided a terminal apparatus including: a communication unit configured to form a plurality of beams and perform communication with a base station; and a control unit configured to transmit each of a plurality of uplink reference signals using beams directed in different directions.

In addition, according to the present disclosure, there is provided a base station, including: a communication unit configured to form a plurality of beams and perform communication with a terminal apparatus; and a control unit configured to transmit each of a plurality of groups of downlink reference signals using a group of beams which come in different directions for the terminal apparatus and pass through each of a plurality of paths.

In addition, according to the present disclosure, there is provided a method, including: performing communication with a base station configured to form a plurality of beams and perform communication, and reporting, by a processor, first report information for downlink user data related to reception results of a group of downlink reference signals including a plurality of downlink reference signals transmitted from the base station using the beams and second report information for beam tracking intended for a terminal apparatus by the base station to the base station.

In addition, according to the present disclosure, there is provided a recording medium having a program recorded thereon, the program causing a computer to function as: a communication unit configured to perform communication with a base station configured to form a plurality of beams and perform communication; and a control unit configured to report first report information for downlink user data related to reception results of a group of downlink reference signals including a plurality of downlink reference signals transmitted from the base station using the beams and second report information for beam tracking intended for a terminal apparatus by the base station to the base station.

In addition, according to the present disclosure, there is provided a method, including: forming a plurality of beams and performing communication with a terminal apparatus; and performing, by a processor, transmission of a group of downlink reference signals including a plurality of downlink reference signals transmitted using beams to the terminal apparatus, reception of first report information for downlink user data related to reception results of the group of downlink reference signals and second report information for beam tracking intended for the terminal apparatus from the terminal apparatus, a first transmission setting based on the first report information, and a second transmission setting based on the second report information.

In addition, according to the present disclosure, there is provided a recording medium having a program recorded thereon, the program causing a computer to function as: a communication unit configured to form a plurality of beams and perform communication with a terminal apparatus; and a control unit configured to perform transmission of a group of downlink reference signals including a plurality of downlink reference signals transmitted using beams to the terminal apparatus, reception of first report information for downlink user data related to reception results of the group of downlink reference signals and second report information for beam tracking intended for the terminal apparatus from the terminal apparatus, a first transmission setting based on the first report information, and a second transmission setting based on the second report information.

In addition, according to the present disclosure, there is provided a method, including: forming a plurality of beams and performing communication with a base station; and transmitting, by a processor, each of a plurality of uplink reference signals using beams directed in different directions.

In addition, according to the present disclosure, there is provided a recording medium having a program recorded thereon, the program causing a computer to function as: a communication unit configured to form a plurality of beams and perform communication with a base station; and a control unit configured to transmit each of a plurality of uplink reference signals using beams directed in different directions.

In addition, according to the present disclosure, there is provided a method, including: forming a plurality of beams and performing communication with a terminal apparatus; and transmitting, by a processor, each of a plurality of groups of downlink reference signals using a group of beams which come in different directions for the terminal apparatus and pass through each of a plurality of paths.

In addition, according to the present disclosure, there is provided a recording medium having a program recorded thereon, the program causing a computer to function as: a communication unit configured to form a plurality of beams and perform communication with a terminal apparatus; and a control unit configured to transmit each of a plurality of groups of downlink reference signals using a group of beams which come in different directions for the terminal apparatus and pass through each of a plurality of paths.

Advantageous Effects of Invention

As described above, according to the present disclosure, it is possible to improve the continuity of beam tracking. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 15 is a diagram for describing report timings of first report information and second report information according to the present embodiment.

FIG. 16 is a diagram for describing report timings of first report information and second report information according to the present embodiment.

FIG. 17 is a sequence diagram illustrating an example of a flow of a beam tracking process executed in a system according to the present embodiment.

FIG. 18 is a diagram for describing an uplink reference signal according to a second embodiment.

Figure 1:
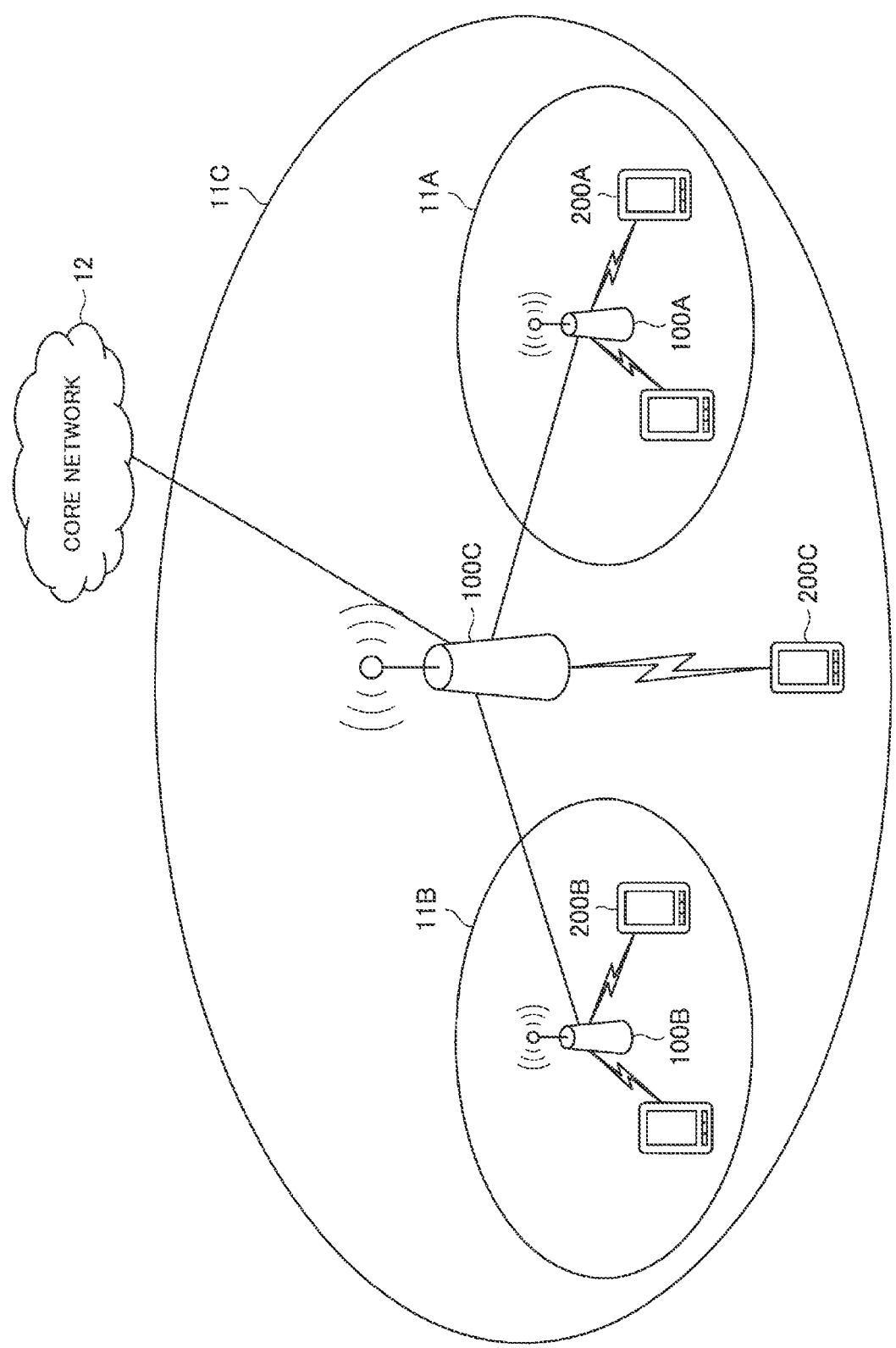
FIG. 1 is a diagram for describing an example of a configuration of a system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structure elements is omitted.

Also, in this specification and the appended drawings, elements having substantially the same function find structure may in some cases be distinguished by different letters appended to the same sign. For example, multiple elements having substantially the same function and structure are distinguished as base stations 100A, 100B, and 100C as appropriate. On the other hand, when not particularly distinguishing each of multiple elements having substantially the same function and structure, only the same sign will be given. For example, the base stations 100A, 100B, and 100C will be simply designated the base stations 100 when not being particularly distinguished.

Further, the description will proceed in the following order.
1. System configuration example
2. Considerations related to beam tracking
2.1. Overview of beam tracking
2.2. SRS
2.3. Other
3. Configuration example of each apparatus
3.1. Configuration example of base station
3.2. Configuration of terminal apparatus
4. First embodiment
4.1. Technical problems
4.2. Technical features
5. Second embodiment
5.1. Technical problems
5.2. Technical features
5.3. Modified example
6. Application examples
7 Conclusion

1.1. System Configuration Example

First, an example of a configuration of a system according to an embodiment of the present disclosure will be described with reference to FIG. 1. FIG. 1 is a diagram for describing an example of a configuration of a system according to the present embodiment. As illustrated in FIG. 1, a system 1 according to the present embodiment includes a base station 100, and a terminal apparatus 200.

The base station 100 is an apparatus which operates a cell 11 and provides radio communication service to the terminal apparatus 200 in the cell 11. As illustrated in FIG. 1, there may be a plurality of base stations 100, and the base stations 100A to 100C operate cells 11A to 11C, respectively, and provide radio communication services to the terminal apparatuses 200A to 200C, respectively. In the example illustrated in FIG. 1, the base stations 100A and 100B are small cell base stations, and the cells 11A and 11B are small cells. Further, the base station 100C is a macro cell base station, and the cell 11C is a macro cell. The macro cell base station 100C has a function of cooperatively controlling radio communication performed by the small cell base stations 100A and 100B subordinate thereto. Further, the base stations 100 are connected to be capable of communicating with each other and are connected via, for example, an X2 interface. Further, the base station 100 and a core network 12 are connected to be capable of communicating with each other and are connected via, for example, an S1 interface.

The terminal apparatus 200 is an apparatus communicating with the base station 100. Typically, the terminal apparatus 200 has high mobility and performs cell selection according to its movement. In addition, in a case in which beams are formed by the base station 100 or the terminal apparatus 200 beam tracking for forming appropriate beams according to the movement of the terminal apparatus 200 and performing communication is performed.

Hereinafter, the base station is also referred to as an evolved Node B (eNB) The base station 100 is not limited to a base station which is operated according to radio access technology in LTE and may be operated in accordance with radio access technology of 5G. In other words, the base station may be called by a name other than "eNB." Similarly, hereinafter, the terminal apparatus is also referred to as a user equipment CUE) or a user, but the terminal apparatus 200 is not limited to a terminal apparatus which is operated in accordance with radio access technology in LTE and may be operated in accordance with radio access technology of 5G.

A core network 12 includes a control node configured to control the base station 100. The cote network 12 may include, for example, an evolved packet core (EPC) or a 5G architecture. The core network 12 is connected to a packet data network through a gateway device.

2. Considerations Related to Beam Tracking

Considerations related to beam tracking will be discussed below from different viewpoints,

2.1. Overview of Beam Tracking (Necessity of Beam Tracking)

It is assumed that an extremely large number of antennas (more specifically, antenna elements) such as, for example, 256 antennas in a 30 GHz band and 1,000 antennas in a 70 GHz band are installed in an eNB. It is possible to form sharper beams as the number of antenna elements increases, for example, it is possible to provide, for example, very sharp beams in which a half-value width (indicating a minimum degree at which a level of 3 dB drop occurs) is 1° or less from the eNB to the UE.

It is assumed that, in an environment in which very sharp beams are formed, the UE can easily leave the beams in a case in which the UE moves at a high speed (for example, the UE moves at 500 km/h). If the UE leaves the beams, it is difficult to transmit data from the eNB to the UE. Therefore, it is desirable that the beams be formed to be able to track the UE moving at a high speed as illustrated in FIG. 2.

Figure 2:
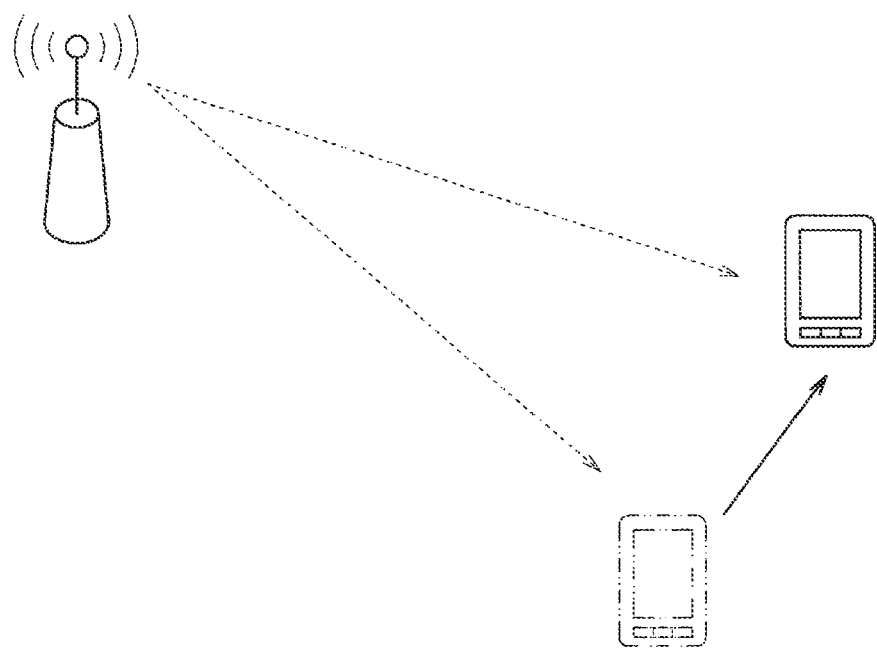
FIG. 2 is a diagram for describing considerations related to beam tracking.

FIG. 2 is a diagram for describing considerations related to beam tracking. As illustrated in FIG. 2, it is desirable to cause beams formed by the eNB to track the movement of the UE.

(Codebook-Based Beam Forming)

In LTE, it is unlikely for a mechanism that causes beams to be changed steplessly and rebuilds beams tracking a UE to be employed. This is because a calculation cost for rebuilding new beams occurs, in this regard, a mechanism for forming beams facing in as many directions as possible in advance from an eNB, selecting beams to be used for communication with a UE among the beams formed in advance, and providing the selected beams is employed in full dimension multi-input multi-output (FD-MIMO) of 3GPP Release 13. Such a mechanism is also referred to as codebook-based beam forming.

For example, in a ease in which beams of 1° are prepared for 360° in a horizontal direction, 360 beams are prepared. In a case in which beams overlap by half, 720 beams are prepared. In a case in which beams is prepared similarly for −90° to +90° in a vertical direction, 360 beams corresponding to 180° are prepared.

In the codebook-based beam forming, beam tracking means continuously selecting beams suitable for communication with a UE among beams prepared in advance as a code book (Beam Tracking Based on Downlink Reference Signal)

In 3GPP RAN1 Release 13 FD-MIMO, beam selection was investigated. In this investigation, selection of beams suitable for communication with the UE by the eNB on the basis of a downlink beam-formed reference signal was investigated. Such a downlink reference signal is also referred to as a beam-formed channel slate information-reference signal (CSI-RS). The eNB provides a plurality of beam-formed CSI-RSs (multiple beam-formed CSI-RSs) and communicates with the UE using beams corresponding to a reception result in the UE. A beam tracking procedure based on the beam-formed CSI-RS will be described below with reference to FIG. 1.

Figure 3:
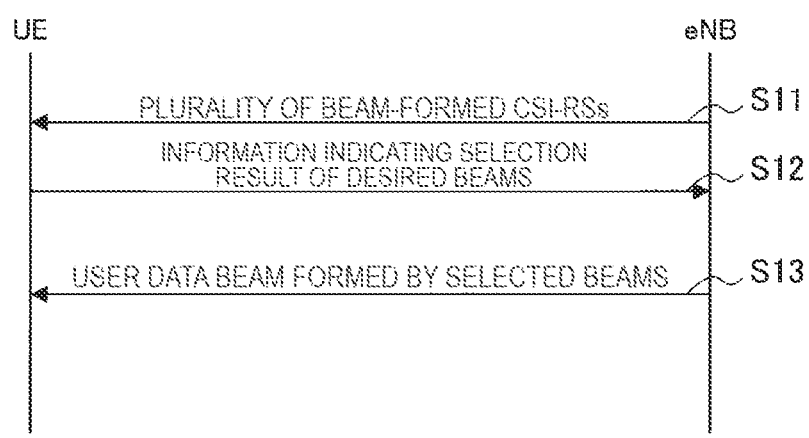
FIG. 3 is a sequence diagram illustrating an example of a flow of a beam tracking procedure based on a beam-formed CSI-RS.

FIG. 3 is a sequence diagram illustrating an example of a beam tracking procedure based on the beam-formed CSI-RS. As illustrated in FIG. 3, first, the eNB transmits a plurality of beam-formed CSI-RSs using a plurality of beams (step S11). Then, the UE selects desired beams among a plurality of beams used for the transmission of the beam-formed CSI-RS on the basis of a reception result of a plurality of provided beam-formed CSI-RSs and transmits information indicating a selection result to the eNB (step S12). The information indicating the selection result includes identification information of desired beams (typically, a beam number). For example, the UE selects one or more desired beams on the basis of the reception power of each beam. Then, the eNB provides user data beam-formed by the selected beams to the UE (step S13).

According to such a procedure, a tracking capability varies depending on a frequency at which a set of a plurality of beam-formed CSI-RSs is provided to the UE. For example, in a case in which a set of a plurality of beam-formed CSI-RSs is provided at intervals of 100 ms, the tracking is performed with a granularity of 100 ms. In a case in which the UE is moving at a speed at which it remains in the beams for 100 ms, the tracking with this granularity is good, but if the speed of the UE increases, for example a case in which tracking with a granularity of 5 ms or less is requited occurs. In this case, the overhead of downlink resources for providing a set of a plurality of beam-formed CSI-RSs increases, and thus it is difficult to perform efficient communication.

(Beam Tracking Based on Uplink Reference Signal)

The eNB decides a plurality of beams used to transmit a plurality of beam-formed CSI-RSs described above on the basis of, typically, the uplink reference signal. The eNB detects a rough position of the UE on the basis of the uplink reference signal, selects a plurality of beam candidates suitable for the UE, and transmits a plurality of beam-formed CSI-RSs using a plurality of selected beam candidates. The uplink reference signal is also referred to as a sounding reference signal (SRS). A beam tracking procedure based on the SRS will be described below with reference to FIG. 4.

Figure 4:
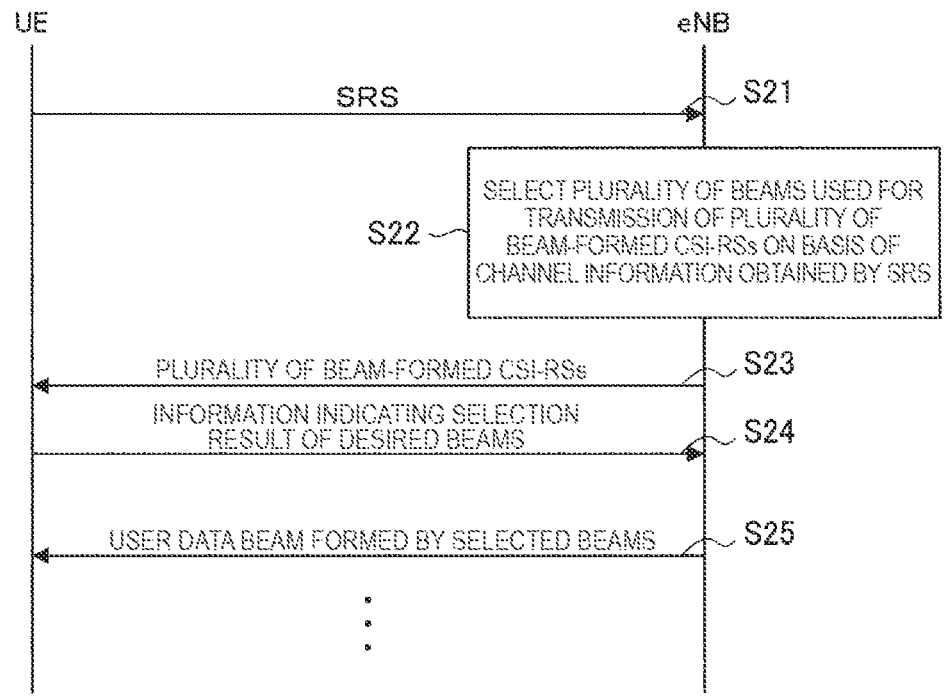
FIG. 4 is a sequence diagram illustrating an example of a flow of a beam tracking procedure based on an SRS.

FIG. 4 is a sequence diagram illustrating an example of a flow of the beam tracking procedure based on the SRS. As illustrated in FIG. 4, the UE first transmits the SRS to the eNB (step S21). Then, the eNB acquires channel information between the UE and the eNB on the basis of a reception result of the SRS, and selects a plurality of beams to be used for transmission of a plurality of beam-formed CSI-RSs on the basis of the channel information (step S22). Thereafter, in steps S23 to S25, a process similar to steps S11 to S13 described above with reference to FIG. 3 is performed.

Here, in the case of time division duplex (TDD), since radio resources are used by uplink and downlink which are switched alternately in terms of time, channel information is similar in downlink and uplink. On the other hand, in the case of frequency division duplex (FDD), since a frequency used for uplink differs from a frequency used for downlink, channel information differs between downlink and uplink. Therefore, in step S21, it can be said that the eNB can acquire (precisely, estimate) the downlink channel information on the basis of the SRS only in the case of TDD.

2.2. SRS

A main purpose of the SRS is for the eNB to acquire the uplink channel information at a frequency bandwidth (that is, bandwidth) to be operated and use the uplink channel information for downlink scheduling rather than the beam selection described above.

"Scheduling" refers to an operation of the eNB deciding part of downlink or uplink resources (unit resources divided by frequency and time) to be used and notifying the UE of the details of the decision. For example, in a case in which the bandwidth operated by the eNB is 20 MHz, a resource block includes 12 sub carriers arranged at intervals of 15 kHz. and 100 resource blocks are spread in 20 MHz. The resources of the 100 resource blocks are shared by a plurality of UEs. In oilier words. FDM is performed. Therefore, if can be said that an operation of deciding a pan of 20 MHz to be used by the UE is the scheduling of the eNB.

The eNB achieves the main purpose described above on the basis of the SRS. Specifically, the eNB acquires the uplink channel information on the basis of the reception result of the SRS, estimates the downlink channel information on the basis of the acquired channel information, and performs the scheduling on the basis of the estimated downlink channel information.

The existing SRS designed for such a main purpose of scheduling is not considered to ire suitable as a reference signal for beam selection. For example, channel information over the entire channel is not necessarily required for beam tracking.

(Format of SRS)

Figure 5:
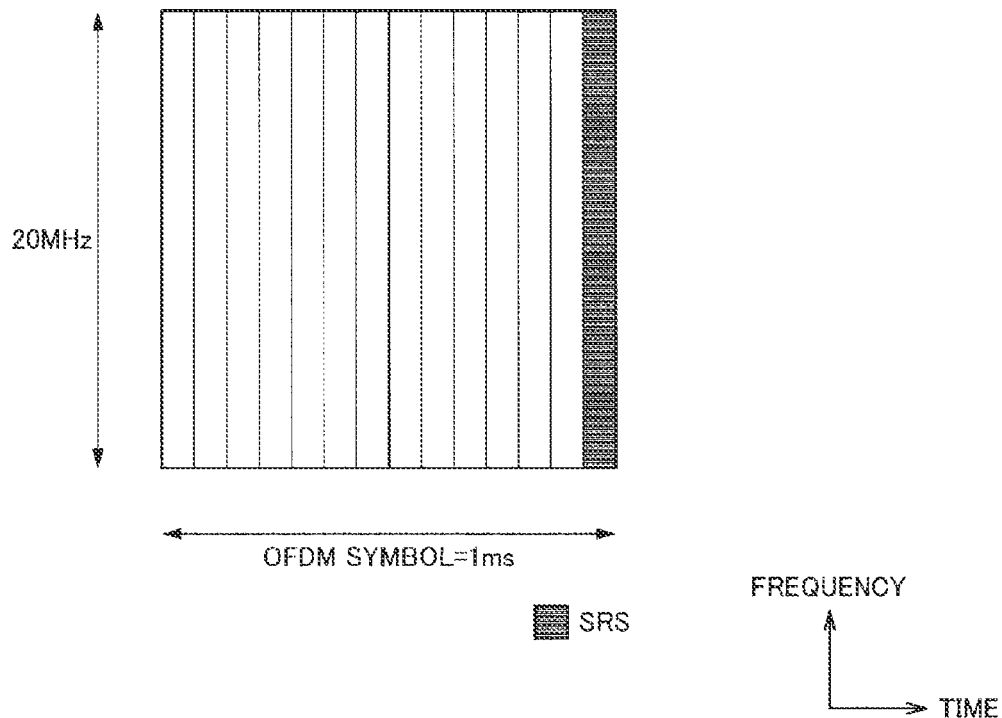
FIG. 5 is a diagram for describing an example of an SRS format in LTE.

FIG. 5 is a diagram for describing an example of a format of the SRS in LTE. The uplink of LTE is operated in accordance with single carrier frequency division multiple access (SC-FDMA), and includes 14 symbols per sub frame. A symbol in the time direction in the uplink is also referred to as an SC-FDMA symbol or an OFDM symbol. As illustrated in FIG. 5, the SRS is transmuted using the last OFDM symbol. Here, the SRS is not necessarily transmitted using the last OFDM symbol in all sub frames. For example, normally, a physical uplink shared channel (PUSCH) serving as user data and a physical uplink control channel (PUCCH) serving as a control signal are transmuted using all 14 OFDM symbols. Further, the SRS is transmitted using the last OFDM symbol only if necessary.

(Narrow Band SRS and Wide Band SRS)

There are cases in which the SRS occupies the entire operated bandwidth and is transmitted all at once as illustrated in FIG. 5. On the other hand, a part of the operated bandwidth may be used for single transmission of the SRS once. The former is also referred to as a wide band SRS, and the latter is also relented to as a narrow band SRS.

Figure 6:
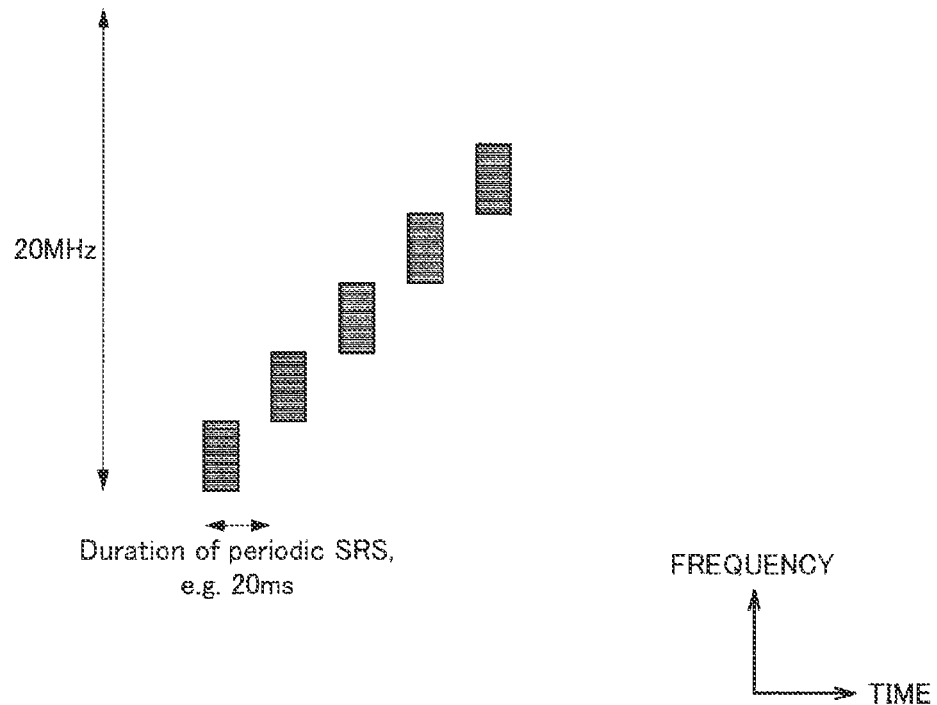
FIG. 6 is a diagram for describing an SRS of a narrow band in LTE.

FIG. 6 is a diagram for describing the narrow band SRS in LTE. As illustrated in FIG. 6, the narrow baud SRS uses a part of the bandwidth in a single transmission. Here, in order to achieve the main purpose of detecting the channel state of the entire bandwidth to be operated, even in foe narrow band SRS, the bandwidth used for transmission is shifted, and the SRS is transmuted over the entire operated bandwidth accordingly as illustrated in FIG. 6. A merit of the narrow band SRS lies in that it is possible to cause the uplink coverage of the SRS to be increased since the UE can use more power for a single transmission of the SRS. In other words, the merit of the narrow band SRS lies in that the quality of the SRS received by the eNB can be improved.

It should be noted here that both of the wide band SRS and the narrow band SRS are designed to be mainly intended to acquire the channel information of the entire operated bandwidth. In other words, a target bandwidth of both of the wide band SRS and the narrow band SRS is the entire bandwidth operated by foe eNB.

(Periodic SRS and Aperiodic SRS)

The eNB can perform a setting in foe UE so that the SRS is transmitted periodically or a periodically.

In a case in which the periodic SRS is set, the eNB performs the setting using radio resource control (RRC) signaling in a semi-static manner. Thus, it is difficult to dynamically change, for example, the transmission period for the periodic transmission.

On the other hand, in the case of the aperiodic SRS, the eNB transmits an SRS request a periodically according to necessity, and the UE transmits the SRS in a case in which the SRS request is received Here, the aperiodic SRS is not considered suitable as a reference signal for periodically selecting beams for beam tracking. This is because the downlink SRS request becomes overhead.

(Relation Between SRS and Beams Selection)

In a case in which the eNB provides beams to the UE, it is desirable to select beams suitable for the UE.

As a method for this purpose, it is considered that the eNB provides a plurality of beam-formed reference signals, and performs communication with the UE using the beams corresponding to the reception result in the UE as described above with reference to FIGS. 3 and 4. In this case, as described above with reference to FIG. 4, the eNB may decide a plurality of beams to be used for transmitting a plurality of beam-formed reference signals on the basis of the SRS This is because the eNB can detect a direction of the UE roughly on the basis of the reception result of the SRS.

As described above, the SRS can be used for selecting the beams to be provided to the UE. On the other hand, since the SRS is the uplink reference signal, it is difficult for the eNB to detect a downlink interference situation on the basis of the reception result of the SRS. Therefore, it is desirable that the UE decide the final beams selection on the basis of the downlink reference signal.

(Conclusion)

The SRS has been described above. The following points have to be noted in a ease in winch the SRS is used for beam tracking.

A first point to be noted is that the existing SRS is mainly intended to acquire the channel information of the entire operated bandwidth. In the existing SRS, the overhead may occur in a case in which it is desired to detect only a direction of beams as in beam tracking, and uplink transmission efficiency may decrease in a case in which it is used for beam tracking.

A second point to be noted is that both the periodic SRS and the aperiodic SRS are not suitable for the purpose of beam tracking, for example, all UEs need not necessarily require very accurate tracking.

A third point to be noted is that it is difficult to detect a downlink interference situation in the SRS. It is desirable that the final beam selection be performed on the basis of the downlink reference signal.

2.3. Others

The difficulty of beam tracking will be discussed below.

First, it is assumed that the UE is stationary without moving at all. In this case, the beams selection for beam tracking is easy because there are many cases in which the beams suitable for the HE are not changed. Mere, even in a case in which the UE is stationary, the beams selection may be performed again due to influence of beam blocking (hereinafter also referred to as blocking) occurring, for example, when a surrounding environment, for example, a shielding object such as a car or a person traverses between the eNB and the UE.

Further, a case in which the UE moves at a high speed is assumed. In this case, since it is necessary to cause beams to track the UE moving at the high speed, thy difficulty of beam tracking is high. In a case in which the beams provided to the UE are sharp, the difficulty level of beam tracking is higher. For example, in a case in which beams of a 1° width are provided, the difficulty level is higher than that, for example, in a case in which beams of a 10° width are provided. As the beams are sharper, a period of time for the UE to move within a range included in beams is reduced.

In a case in which a discontinuous change in a channel environment occurs irrespective of the moving speed of the UE, the difficulty level of the beam selection is high. The discontinuous change in the channel environment occurs, for example, in a case in which a shielding object suddenly enters between the eNB and the UE, in a case in which the UE with the antennas placed in a plane manner is suddenly rotated, or the like, in this case, the beams suitable for the UE may change. Further, it is considered that there are cases in which beams reaching the UE indirectly are more suitable than beams reaching the UE directly.

3. Configuration Example of Each Apparatus

Figure 7:
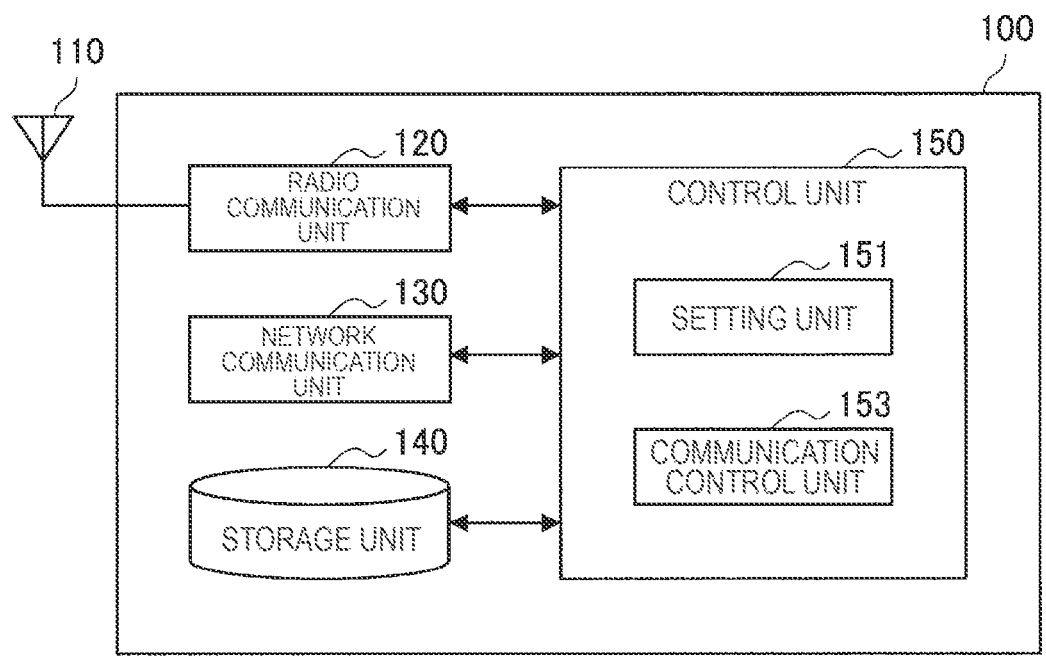
FIG. 7 is a block diagram illustrating an example of a configuration of a base station according to the present embodiment.

Next, an example of a configuration of each apparatus included in a system 1 according to one embodiment of the present disclosure will be described 3.1. Configuration Example of Base Station FIG. 7 is a block diagram illustrating an example of a configuration of the macro cell base station 100 according to the present embodiment. As illustrated in FIG. 7, the macro cell base station 100 includes an antenna unit lib, the radio communication unit 120, a network communication unit 130, a storage unit 140 and a control unit 150.

(1) Antenna Unit 110

The antenna unit 110 emits a signal to be output by the radio communication unit 120 into space as radio waves. In addition, the antenna unit 110 converts spatial radio waves into a signal and outputs the signal to the radio communication unit 120.

In particular, in the present embodiment, the antenna unit 110 includes a plurality of antenna elements and is capable of performing beam forming.

(2) Radio Communication Unit 120

The radio communication unit 120 transmits and receives signals. For example, the radio communication unit 120 transmits a downlink signal to the terminal apparatus and receives an uplink signal from the terminal apparatus.

In particular, in the present embodiment, the radio communication unit 120 can form a plurality of beams through the antenna unit 110 and communicate with the terminal apparatus 200.

(3) Network Communication Unit 130

The network communication unit 130 transmits and receives information. For example, the network communication unit 130 transmits information to another node and receives information from the other node, for example, the other node includes another base station and a core network node.

(4) Storage Unit 140

The storage unit 140 temporarily or permanently stores a program and various data for an operation of the base station 100.

(5) Control Unit 150

The control unit 150 provides various functions of the base station 100. The control unit 150 includes a setting unit 151 and a communication control unit 153. Further, the control unit 150 may further include other components than these components. In other words, the control unit 150 may also perform operations other than those of these components. The operations of the setting unit 151 and the communication control unit 153 will be described later in detail.

3.2. Configuration of Terminal Apparatus

Figure 8:
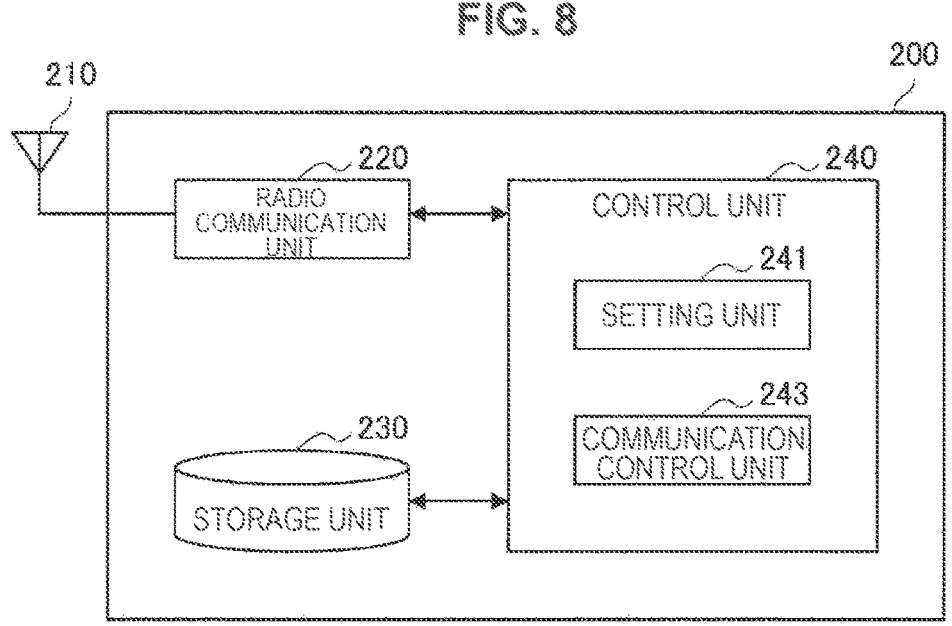
FIG. 8 is a block diagram illustrating an example of a configuration of a terminal apparatus according to the present embodiment.

FIG. 8 is a block diagram illustrating an example of a configuration of the terminal apparatus 200 according to the present embodiment. As illustrated in FIG. 8, the terminal apparatus 200 includes an antenna unit 210, a radio communication unit 220, a storage unit 230 and a control unit 240.

(1) Antenna Unit 210

The antenna unit 210 emits a signal to be output by the radio communication unit 220 into space as radio waves. In addition, the antenna unit 210 converts spatial radio waves into a signal and outputs the signal to the radio communication unit 220.

(2) Radio Communication Unit 220

The radio communication unit 220 transmits and receives signals. For example, the radio communication unit 220 receives a downlink signal from the base station and transmits an uplink signal to the base station.

In particular, in the present embodiment, the radio communication unit 220 can communicate with the base station 100 that forms a plurality of beams and perform communication.

(3) Storage Unit 230

The storage unit 230 temporarily or permanently stores a program and various data for an operation of the terminal apparatus 200.

(4) Control Unit 240

The control unit 240 provides various functions of the terminal apparatus 200. The control unit 240 includes a setting unit 241 and a communication control unit 243. Further, the control unit 240 may further include other components than these components. In other words, the control unit 240 may also perform operations other than those of these components. The operations of the setting unit 241 and the communication control unit 243 will be described later in detail.

Hereinafter, the base station 100 is also referred to as an eNB 100, and the terminal apparatus 200 is also referred to as a UE 200.

4. First Embodiment in a first embodiment, the UE 200 feeds report information for beam tracking hack, and the accuracy of beam tracking by the eNB 100 is improved.

4.1. Technical Problems (1) Description of Problems

A high frequency of beam selection is desirable for UEs which axe moving. On the other hand, a low frequency of beam select ion is desirable for UEs which are not moving. This is because as the frequency of beam selection increases, the overhead by the reference signals such as the uplink SRS and the downlink CSI-RS increases, and the system throughput is likely to decrease.

According to the mechanism described above with reference to FIGS. 3 and 4, the beam selection is performed on the basis of the SRS and the plurality of beam-formed CSI-RSs. In such a mechanism, it is important to appropriately set the following four setting items:

a period of the uplink reference signal (for example, the SRS);

selection of beams for the beam-formed downlink reference signal (for example, the beam-formed CSI-RS);

the number of beam-formed downlink reference signals; and a period of the beam-formed downlink reference signal.

(2) About Uplink Reference Signal

Technical problems related to the uplink reference signal will be described below Scheduling of the SRS is performed by the eNB. The SRS is transmitted periodically or aperiodically.

As described above, the eNB sets the periodic SRS in a quasi-static manner. More specifically, the eNB sets resources of the periodic SRS, that is, the period of the SRS, in a quasi-static manner. For this reason, it is difficult for the eNB to flexibly change the period of the SRS in accordance with the moving speed of the UE or the like. In other words, for the periodic SRS, it is difficult to appropriately set the period of the uplink reference signal for the beam selection.

On the other hand, for the aperiodic SRS, the eNB transmits the SRS request aperiodically as described above. However, in a case in winch the aperiodic SRS is used for the beam selection, the SRS request is performed with a high frequency. Therefore, when the aperiodic SRS is used for the beam selection, the downlink system throughput is likely to be lowered. In other words, for the aperiodic SRS, it is difficult to appropriately set the period of the uplink reference signal for the beam selection.

Due to such difficulties, for example, a method in which the eNB estimates the position, the moving speed, or the like of the UE on the basis of the reception result of the SRS provided from the UE and sets resources such as the period of the SRS is considered. However, in this method, since it takes time to change the setting of the SRS, for example, in a case in which the moving speed suddenly changes, beam tracking (that is, selection of appropriate beams) may not be performed in time. In other words, even in this method, it is difficult to appropriately set the period of the uplink reference signal for the beam selection.

Further, since the SRS provided by the UE is typically transmitted by a non-directional antenna, a collision may occur between the SRSs transmitted from different UEs. Therefore, it is desirable for the UE to transmit the SRS using resources whose orthogonality is maintained in terms of frequency or time, and it is difficult to make the period of the SRS extremely short or the like (3) Beam-Formed Downlink Reference Signal Technical problems related to the downlink reference signal will be described below with reference to FIGS. 9 to 12. FIGS. 9 to 12 are diagrams for describing the technical problems related to the downlink reference signal.

Figure 9:
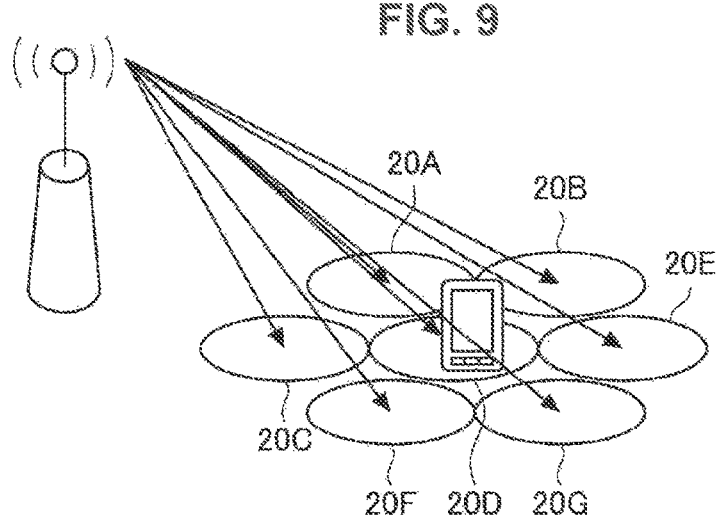
FIG. 9 is a diagram for describing technical problems related to a beam-formed downlink reference signal.

As described above with reference to FIG. 4, the eNB detects Ore rough position of the UE on the basis of the SRS and selects a plurality of beam candidates suitable for the UE. Then, the eNB transmits a plurality of beam-formed CSI-RSs using the plurality of selected beam candidates as illustrated in FIG. 9. In lire example illustrated in FIG. 9, a plurality of beam-formed CSI-RSs are transmitted to areas 20A to 20G; and the UE is located in the area 20D at the center, in other words, a plurality of beam-formed CSI-RSs roughly detect the UE.

Thereafter, the UE selects one or more desired beams among a plurality of beams used for transmitting the beam-formed CSI-RS on the basis of a reception result of a plurality of provided beam-formed CSI-RSs, and transmits information indicating a selection result to the eNB. For example, in the example illustrated in FIG. 10, the UE selects beams directed toward the area 20D. Then, the eNB selects beams suitable for the UE on the basis of the information indicating the beam selection result. For example, in the example illustrated in FIG. 10, the eNB selects beams directed toward the area 20D on the basis of the feedback from the UE.

Figure 10:
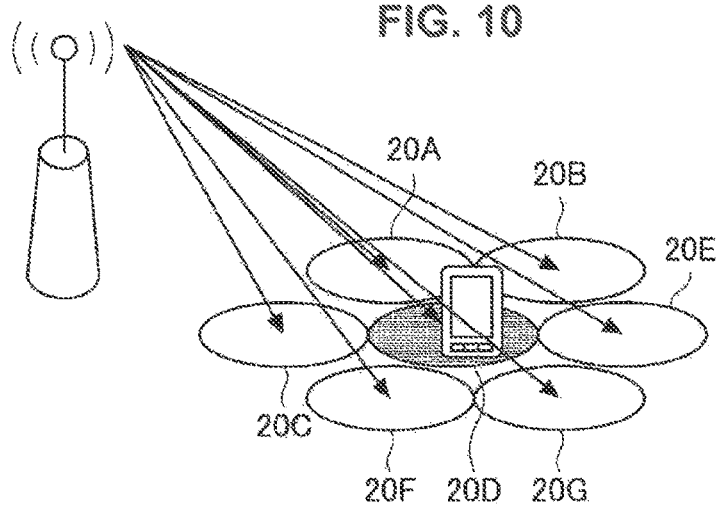
FIG. 10 is a diagram for describing technical problems related to a beam-formed downlink reference signal.
Figure 11:
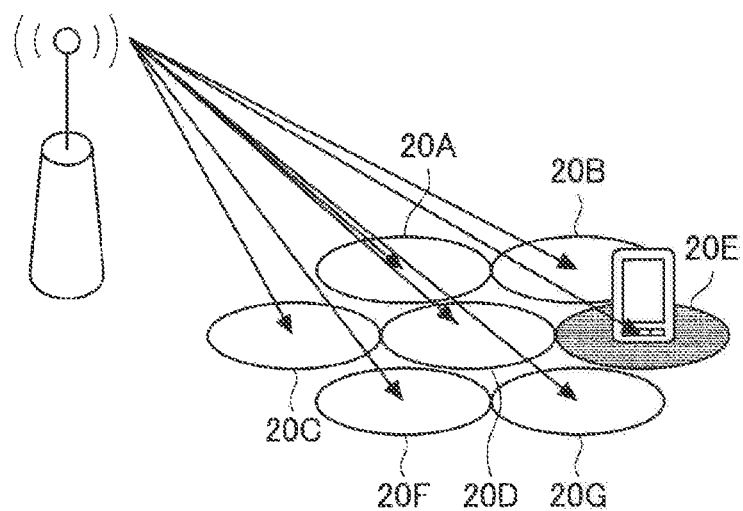
FIG. 11 is a diagram for describing technical problems related to a beam-formed downlink reference signal.
Figure 12:
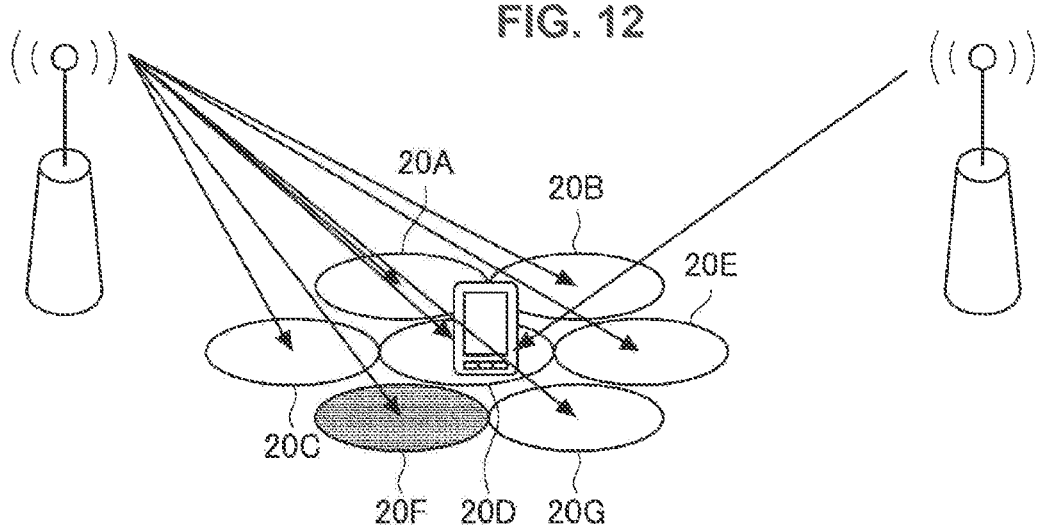
FIG. 12 is a diagram for describing technical problems related to a beam-formed downlink reference signal.

Here, the eNB can determine whether or not a plurality of beams used for transmitting the plurality of beam-formed CSI-RSs are appropriate, that is, whether or not beam tracking is going well, on the basis of the information indicating the beam selection result. For example, in a case in which beams directed toward the center area 20D among a plurality of areas 20, drat is, central beams among a plurality of beams, are selected as illustrated in FIG. 10, beam tracking is determined to be going well. On the other hand, in a case in which beams directed toward live end area 20E among a plurality of areas 20, that is, beams at the edge among a plurality of beams, are selected as illustrated in FIG. 11, beam tracking is determined not to be going well.

However, an error is likely to occur in the determination of whether or not beam tracking based on the beam selection result is appropriate. For example, the UE is likely to select beams on the basis of a signal interference noise ratio (SINK) in which interference received from beams directed toward other UEs, interference received from beams provided from adjacent eNBs. and the like are considered, and an interference amount is considered. For example, in the example illustrated in FIG. 12, the UE selects beams directed toward oilier areas 20F in consideration of interference received from beams provided from adjacent eNBs although beams directed toward the area 20D are appropriate from a viewpoint of beam tracking. For this reason, although the beams at the center of the beam-formed CSI-RSs detect the UE, and beam tracking is going well, the eNB determines that beam tracking is not going well.

As described above, there are cases in which it is difficult for the eNB to appropriately determine whether or not beam tracking is going well. In other words, there are cases in which it is difficult to appropriately set the beam selection for the beam-formed downlink reference signal, the number of beam-formed downlink reference signals, and the provision period of the beam-formed downlink reference signal

4.2. Technical Features

In light of the above technical problem, in the present embodiment, report information for beam tracking is provided. Accordingly, it is possible for the eNB 100 to appropriately determine whether or not beam tracking is going well and it is possible to improve the accuracy of beam tracking. The technical features according to the present embodiment will be described below.

(1) Two Types of Report Information

The eNB 100 (for example, the communication control unit 153) transmits a group of downlink reference signals including a plurality of downlink reference signals transmitted using beams to the UE 200. In other words, the eNB 100 forms beams and transmits each of a plurality of downlink reference signals included in a group of downlink reference signals. Such a downlink reference signal transmitted through the formed beams is also referred to as a beam-formed downlink reference signal (BF DL RS). The BF DL RS may be, for example, the beam-formed CSI-RS described above, and a plurality of beam-formed CSI-RSs may form a group of BF DL RSs. The eNB 100 select a group of beams (that is, a plurality of beams) used for transmitting a group of downlink reference signals on the basis of the reception result of the uplink reference signal (typically, non-directional) transmitted from the UE 200. The uplink reference signal (UL RS) may be, for example, the SRS described above.

The UE 200 (for example, the communication control unit 243) reports first report information for downlink user data related to the reception result of a group of BF DL RSs including a plurality of BF DL RSs transmitted using the beams from the eNB 100 and second report information for beam tracking for the UE 200 by the eNB 100 to the eNB 100. Since the second report information for beam tracking is reported separately from the first report information for data communication with the UE 200, the eNB 100 can appropriately determine whether or not beam tracking is going well.

For example, the first report information includes information indicating the reception result of a group of BF DL RSs in which interference is considered. For example, the first report information includes information (that is, identification information, typically, a beam ID) indicating a beam selection result based on the SINR in which the interference amounts such as interference received from beams directed towards other UEs 200 and interference from other cells are considered. Accordingly, the eNB 100 can appropriately select beams to be used for transmitting user data.

For example, the second report information may include the information indicating the reception result of a group of BF DL RSs hi which interference is not considered. The second report information may include various types of information.

For example, the second report information may include information indicating beams having the highest reception power among a group of beams used for transmitting a group of BF DL RSs. Accordingly, the eNB 100 can determine whether or not beam tracking is appropriate. For example, in a case in which the beams having the highest reception power reported as the second report information are the beams at the center in a group of beams used for transmitting a group of BF DL RSs, the eNB 100 determines that beam tracking is going well. On the other hand, in a case in which the beams having the highest reception power reported as the second report information are the beams at the center in a group of beams used for transmitting a group of BF DL RSs, the eNB 100 determines that beam tracking is not going well. This point wall be described in detail with reference to FIG. 13.

Figure 13:
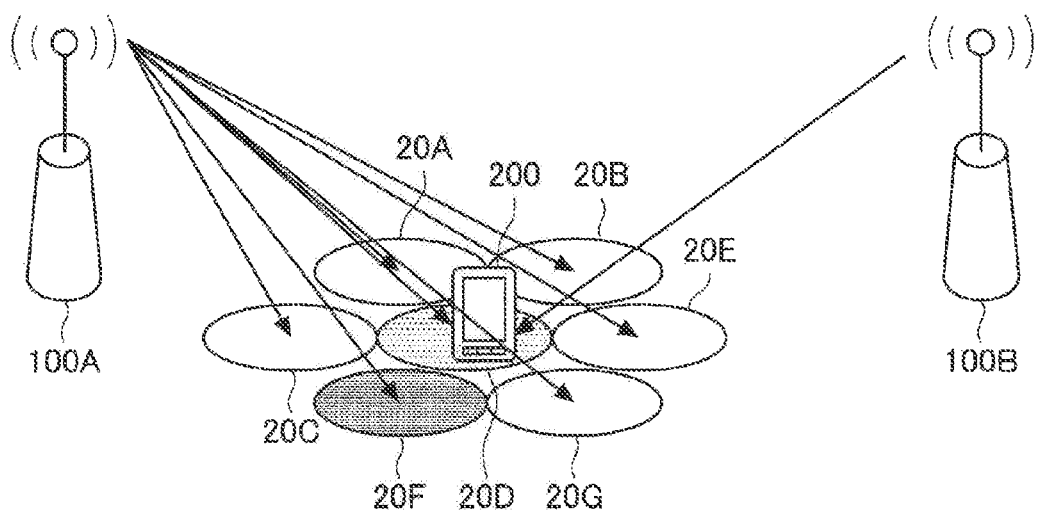
FIG. 13 is a diagram for describing first report information and second report information according to a first embodiment.

FIG. 13 is a diagram for describing the first report information and the second report information according to the present embodiment. As illustrated in FIG. 13, an eNB 100A transmits a group of BF DL RSs to a plurality of areas 20, and the UE 200 is located in an area 200 at the center. Meanwhile, the UE 200 receives interference from the beams transmitted from the eNB 100B. In this regard, the UE 200 reports the beam ID of the beams directed toward an area 20F in which there is no interference as the first report information. Further, the UE 200 reports the beam ID of the beams directed toward the area 20D in which the reception power of the beams from the eNB 100A is highest as the second report information. On the basis of the second report information, the eNB 100A can determine that beam tracking is going well. Further, the eNB 100A can then appropriately select a group of beams for a group of BF DL RSs.

Further, for example, the second report information may include information indicating whether or not beam tracking by the eNB 100 is appropriate. The information indicating whether or not beam tracking is appropriate may be, for example, information indicating whether or not the beams at the center among a plurality of beams used for transmitting a group of BF DL RSs have the highest reception power. Since live second report information can be indicated by, for example, one bit, the overhead of uplink can be reduced.

For example, in air environment in which the UE 200 transmits an UL RS for beam tracking by the eNB 100, the second report information may include information for requesting a change in a transmission period of the UL RS. For example, the second report information may include information for requesting the transmission period of the UL RS to be increased or decreased. Accordingly, the eNB 100 can appropriately set the transmission period of the UL RS.

For example, the second report information may include information for requesting a change in the number of downlink reference signals. For example, the second report information may include information for requesting the number of groups of BF DL RSs, that is, the number of beams used for transmission, to be increased or decreased. Thereby, the eNB 100 can appropriately set the number of BF DL RSs.

For example, the second report information may include information for requesting a change in a transmission period of a group of BF DL RSs. For example, the second report information may include information for requesting the transmission period of a group of BF DL RSs to be increased or decreased. Accordingly, the eNB 100 can appropriately set the transmission period of a group of BF DL RSs.

(2) Control Based on Report Information

The eNB 100 (for example, the setting unit 151) performs reception of the first report information for the downlink user data related to the reception result of a group of BF DL RSs and the second report information for beam tracking intended for the UE 200 from the UE 200 and a first transmission setting based on the first report information and a second transmission setting based on the second report information.

Specifically, the eNB 100 selects beams to be used for transmitting user data to the UE 200 as the first transmission setting. Accordingly, the eNB 100 can transmit the user data using beams having the best SINR in which the interference amount in the UE 200 is considered.

Further, the eNB 100 can perform various settings as the second transmission setting.

For example, the eNB 100 may set the transmission period of the uplink reference signal transmitted from the UE 200 as the second transmission setting. For example, when the transmission period of the UL RS is set to be short, the eNB 100 can provide a group of BF DL RSs using more appropriate beams, and it is possible to improve the accuracy of beam tracking. Further, when the transmission period of the UL RS is set to be long, the eNB 100 can reduce the overhead by the UL R S. The eNB 100 may gradually increase the transmission period of the UL RS in a case in which beam tracking is going well.

For example, the eNB 100 may set the transmission period of a group of BF DL RSs as the second transmission setting. For example, when the transmission period is set to lie short, the eNB 100 can provide a group of BF DL RSs using more appropriate beams, and it is possible to improve the accuracy of beam tracking. Further, when the transmission period is set to be long, the eNB 100 can reduce the overhead by a group of BF DL RSs.

For example, the eNB 100 may set the number of BF DL RSs included in a group of BF DL RSs as the second transmission setting. For example, when the number of BF DL RSs is set to be increased, the eNB 100 can further increase an area covered by a group of BF DL RSs, and it is possible to prevent a tracking error.

For example, eNB 100 may set beams used for a group of BF DL RSs as the second transmission setting. For example, the eNB 100 first estimates a moving direction of the UE 200 on the basis of a chronological change in the beam selection result included in the second report information. Then, in a case in which it is determined that beam tracking is not going well, the eNB 100 performs, for example, a setting for changing the beams used for transmitting a group of BF DL RSs in the estimated moving direction. With such a setting, the eNB 100 can perform beam tracking more accurately.

For example, the eNB 100 may set sharpness of the beams used for transmitting a group of downlink reference signals as the second transmission setting. For example, when the sharpness of the beams is set loosely, the eNB 100 can cause the area covered by one beam to be increased and further increase the area covered by a group of BF DL RSs. and it us possible to prevent the tracking error.

(3) Means for Reporting Report Information

Various means for reporting the first report information and the second report in formation can be considered.

For example, the UE 200 (for example, the communication control unit 243) may report the first report information and the second report information as separate messages. When this mechanism is used, for example, the UE 200 can select report information to be reported in accordance to necessity or change a report period. Further, the UE 200 may encode the first report information and the second report information into one message and report them. In this case, the UE 200 can reduce the overhead of the uplink Report timings of the first report information and the second report information will be described below with reference to FIGS. 14 to 16.

Figure 14:
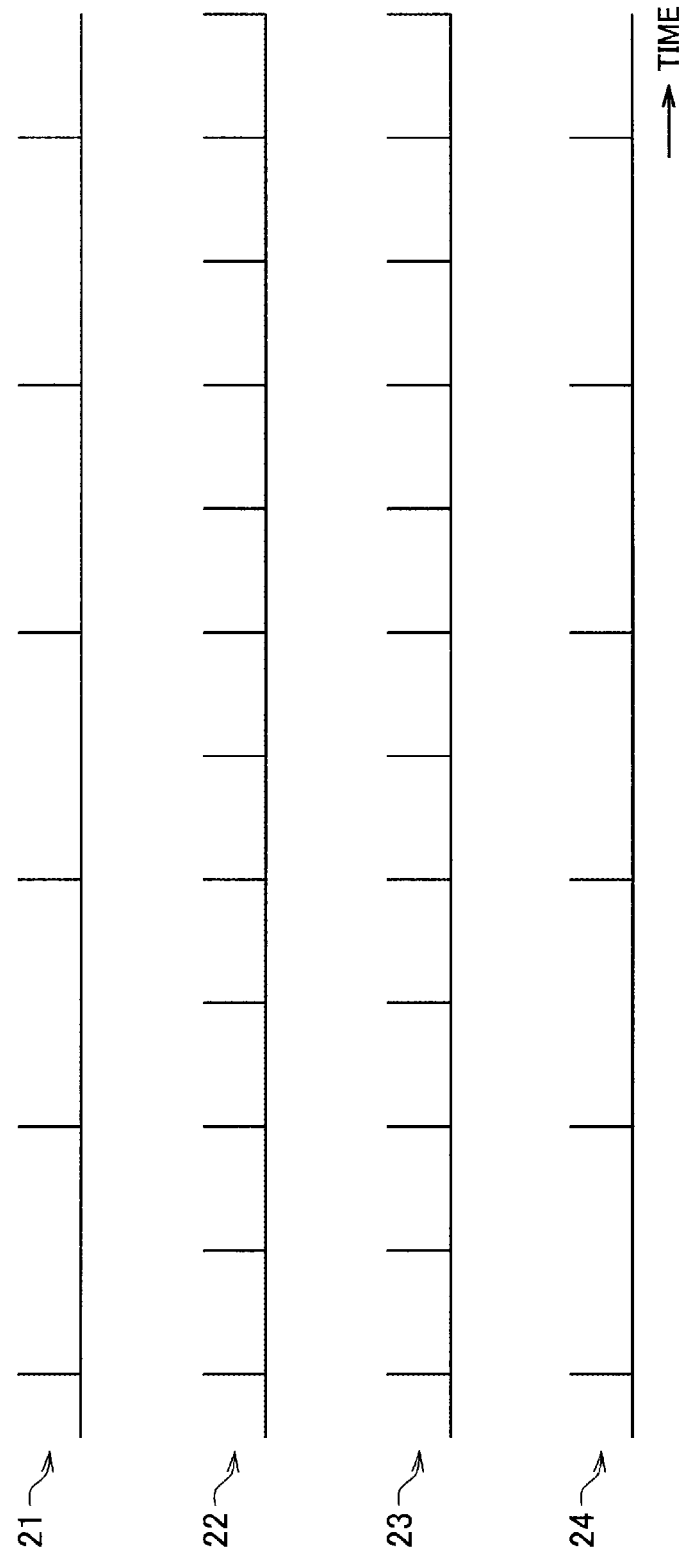
FIG. 14 is a diagram for describing report tunings of first report information and second report information according to the present embodiment.

FIGS. 14 to 16 are diagrams for describing the report timings of the first report information and the second report information according to the present embodiment. In FIGS. 14 to 16, a horizontal axis is a time axis, and perpendicular lines on the time axis indicate transmission timings of the UL RS, a group of BF DL RSs, the first report information, and the second report information. For example, the UL RS is transmitted at a transmission period indicated by reference numeral 21, the group of BF DL RSs is transmitted at a transmission period indicated by reference numeral 22, the first report information is transmitted at a transmission period indicated by reference numeral 23, and the second report information is transmitted with a transmission period indicated by reference numeral 24. As illustrated in FIGS. 14 to 16, the transmission periods of the UL RS and a group of BF DL RSs may be different. Further, as illustrated in FIGS. 14 and 15, the report periods of the first report information and the second report information may be different. On the other hand, as illustrated in FIG. 6, the report periods of the first report information and the second report information may be identical to each oilier.

Further, the UL RS is used for detecting a rough position of the UE, and a group of BF DL RSs is used for detecting an exact position of the UE. Therefore, as illustrated in FIG. 16, it is assumed that the transmission period of the UL RS is longer than the transmission period of a group of BF DL RSs.

(4) Flow of Process

A flow of a beam tracking process in the system 1 according to the present embodiment will be described below with reference to FIG. 17.

FIG. 17 is a sequence diagram illustrating an example of the flow of the beam tracking process executed in the system 1 according to the present embodiment. As illustrated in FIG. 17, the eNB 100 and the UE 200 are involved in the present sequence.

First, the eNB 100 transmits setting information for the periodic UL RS to the UE 200 (step S102). The setting information includes, for example, information indicating the transmission period. Then, the UE 200 transmits the UL RS to the eNB 100 on the basis of the received setting information (step S104). Then, the eNB 100 estimates a rough position of the UE 200 on the basis of the received UL RS, and sets a group of beams used for transmitting a group of BF DL RSs so that the estimated rough position is covered (step S106). Then, the eNB 100 transmits a group of BF DL RSs to the UE 200 using the group of set beams (step S108). Then, the UE 200 transmits the first report information and the second report information to the eNB 100 (steps S110, S112).

5. Second Embodiments

A second embodiment is a mode in which blocking resistance is improved by communication using a plurality of beams paths.

5.1. Technical Problems

There are cases in which, when a shielding object such as a car or a building enters between the eNB and the UE, a beam path which is suitable for communication until now may be suddenly lost, or an appropriate beam path is suddenly changed. In this case, the UE may fail to receive a group of BF DL RSs transmitted from the eNB, the continuity of beam tracking may be lost, and data communication may be interrupted.

Further, although the UE fails to receive a group of BF DL RSs, it is difficult to identify a cause thereof. For example, possible causes are what the reception power is low because a group of BF DL RSs are shielded by the shielding object and what the reception power is low because a direction of beams is not directed toward itself. Further, it is difficult for the UE to recognize an incomprehensible phenomenon that originally low reception power is further reduced, for example in a case in which a group of BF DL RSs are shielded by the shielding object while moving.

Such difficulty is stronger as the beams get sharper. U is because the UE which is out of the beams range can hardly receive power from the beams. Further, in a case in which the UE can hardly receive power from the beams, it is difficult to identify a cause thereof.

Even if the cause could be identified, for example, the UE first detects that there is a shielding object only after it can hardly power from the beams directed toward itself.

On the other hand, if a geolocation database or the like is constructed, and a map of buildings in a cell is created, the eNB may to be able to recognize the presence or absence of shielding objects in a case in which the beams are provided to the UE. However, it is difficult for the eNB to predict blocking of beams by moving shielding objects such as humans or automobiles.

5.2. Technical Features in light of the above technical problems, in the present embodiment, a plurality of different beam paths, more specifically, a beam path using a reflected wave is provided in addition to a beam path using a direct wave. Accordingly, it is possible to improve resistance to blocking. More specifically, even in a case in which the beam path using the direct wave is lost, it is possible to continue beam tracking using the beam path using the reflected wave. The technical features according to the present embodiment will be described below.

Further, hereinafter, beams generated by the UE are also referred to as UE beams, and beams generated by the eNB are also referred to as eNB beams.

(1) BF UL RS

Figure 19:
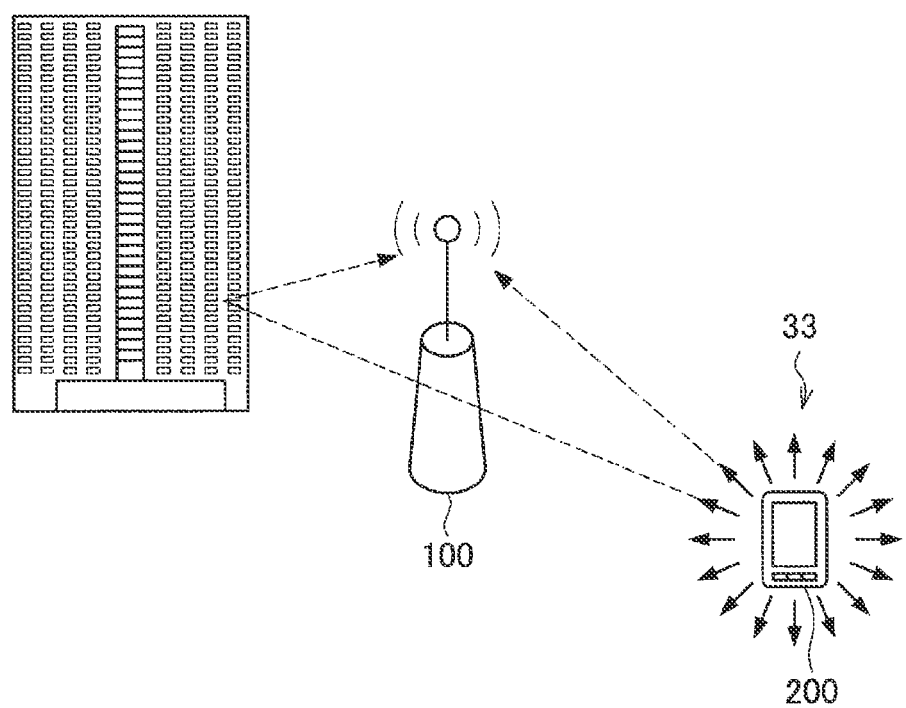
FIG. 19 is a diagram for describing an uplink reference signal according to the present embodiment.
Figure 20:
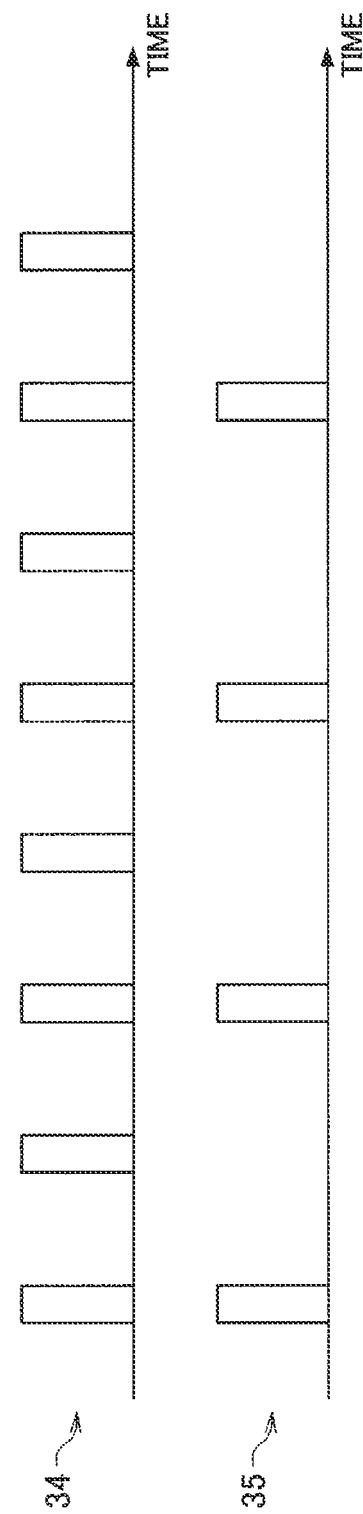
FIG. 20 is a diagram for describing an uplink reference signal according to the present embodiment.

The uplink reference signal transmitted from UE 200 will be described below with reference to FIGS. 18 to 20. FIGS. 18 to 20 are diagrams for describing the uplink reference signal according to the present embodiment.

The UE 200 (for example, the communication control unit 243) perform transmission using UE beams in which a plurality of uplink reference signals are directed in different directions. In other words, the UE 200 forms beams by the UE beams in which a plurality of uplink reference signals are directed in different directions and performs transmission, the uplink reference signal transmitted through the formed beams Is also called a beam-formed uplink reference signal (BP UL RS).

As illustrated in FIG. 18, the UE 200 transmits BF UL RSs 31 and 32 in a plurality of directions in which it is desired to receive data signal from the eNB 100 in a diversity manner. Accordingly, the eNB 100 can detect a reflection situation around the UE 200 and transmit a data signal so that the UE 200 receives the data signal in a plurality of directions accordingly. At this time, for example, the UE 200 transmits the BF UL RS 31 using first UE beams corresponding to a first direction and transmits the BF UL RS 32 using second UE beams corresponding to a second direction. The UE beams may be lower in directivity than the eNB beams. For example, the UE beams may have a half-value width of about 30° to 60°. Further, the UE 200 may not transmit a plurality of BF UL RSs in one direction as in a group of BF DL RSs.

Here, as illustrated in FIG. 19, even in a case in which the UE 200 transmits a non-directional UL RS 33 (for example, an SRS), the eNB 100 receives the UL RS which has passed through of least two paths of the direct wave and the reflected wave UL RS in a plurality of directions. However, in this case, it is difficult for the eNB 100 to recognize whether the UL RSs received in a plurality of directions have passed through paths in different directions for the UE 200 or have passed through paths in the same direction for the UE 200. The UL RSs received in a plurality of directions are considered to pass through paths in different directions for the UE 200, for example, in a ease in which the UL RS is reflected by reflective objects in the vicinity of the UE 200 as illustrated in FIG. 18. Further, the UL RSs received in a plurality of directions are considered to pass through paths in the same direction for the UE 200, for example, in a case in which the UL RS is reflected by reflective objects in the vicinity of the eNB 100, as illustrated in FIG. 19. If improvement in resistance to blocking is considered, it is desirable that the data signal be transmitted via the beam paths passing through different directions for the UE 200. Therefore, the non-directional UL RS in which it is difficult to recognize whether or not the UL RSs received in a plurality of directions have passed through paths in different directions for the UE 200 is not appropriate in the present embodiment.

The UE 200 transmits each of a plurality of BF UL RSs using resources orthogonal to each other in terms of at least one of time, frequency, or a code. Accordingly, the eNB 100 can distinguish and receive each of a plurality of BF UL RSs. Further, in the example illustrated in FIG. 18, orthogonal resources are used in the BE UL RS 31 and the BF UL RS 32. On the other hand, in the example illustrated in FIG. 19, the non-directional UL RS 33 is transmitted using one resource (that is, a non-orthogonal resource).

Here, as illustrated in FIG. 20, the UE 200 may transmit a plurality of BF UL RSs at different transmission periods. In FIG. 20, a horizontal axis is a time axis, and rectangles on the time axis indicate transmission timings of a plurality of BF UL RSs. For example, the BF UL RS 31 illustrated in FIG. 18 is transmitted at a transmission period indicated by reference numeral 34, and the BF UL RS 32 is transmitted at a transmission period indicated by reference numeral 35. In this case, signaling corresponding to each BF UL RS will also be set to have a different period. For example, a short transmission period may be set for a BF UL RS having a main role, and a long transmission period may be set for a BF UL RS having a sub role prepared against blocking.

Further, the UE 200 (for example, the setting unit 241) may set a plurality of UE beams used for transmitting a plurality of BF UL RSs using various methods. For example, the UE 206 may use the UE beams set by the eNB 100. In this case, for example, the eNB 100 (for example, the setting unit 151) may designate UE beams to be used in the SRS request for transmitting the aperiodic SRS. Further, the UE 200 may transmit the BF UL RS using the UE beams designated in the SRS request.

(2) Plurality of Groups of BF DL RSs

Figure 21:
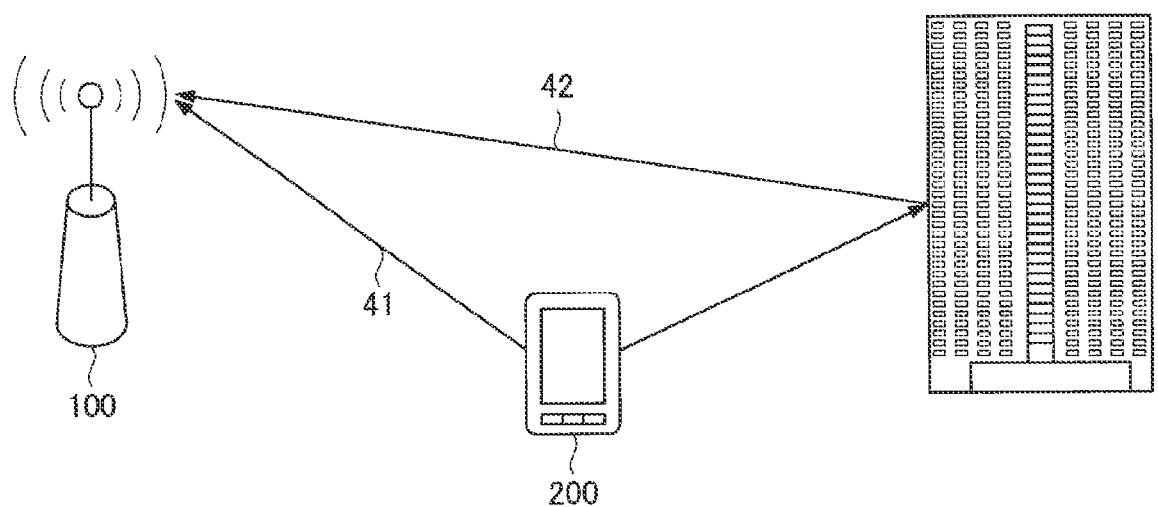
FIG. 21 is a diagram for describing a downlink reference signal according to the present embodiment.
Figure 22:
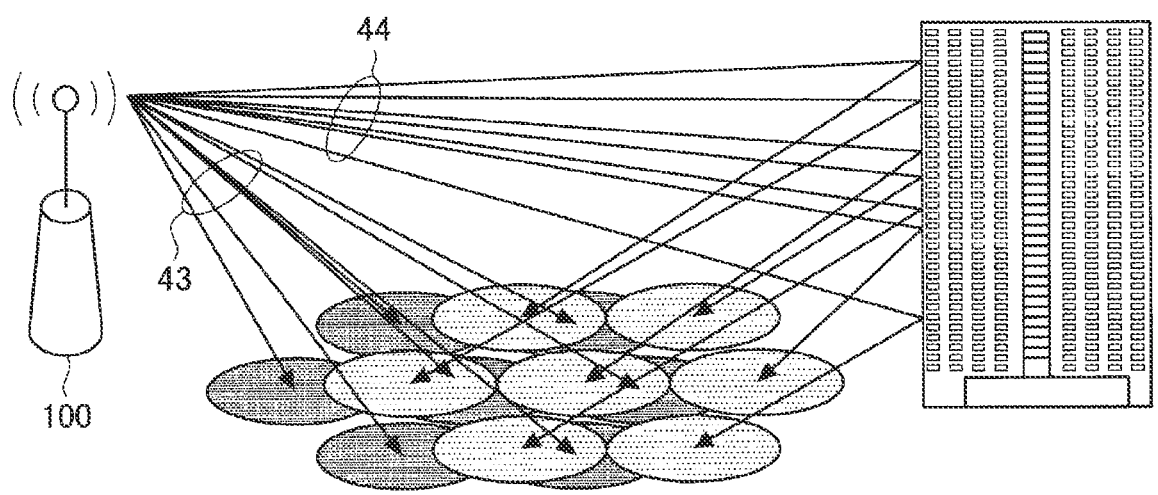
FIG. 22 is a diagram for describing a downlink reference signal according to the present embodiment.
Figure 23:
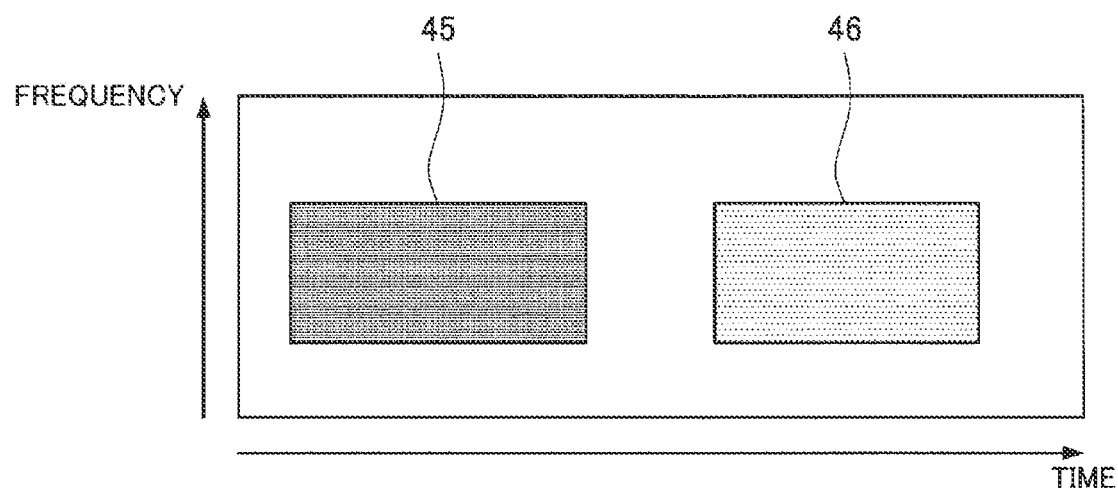
FIG. 23 is a diagram for describing a downlink reference signal according to the present embodiment.

The downlink reference signal transmitted from the eNB 100 will be described below with reference to FIGS. 21 to 23. FIGS. 21 to 23 are diagrams for describing the downlink reference signal according to the present embodiment.

The eNB 100 (for example, the communication control unit 153) transmits each of a plurality of groups of downlink reference signals using a group of eNB beams which come in different directions for the UE 200 and pass through each of a plurality of paths. Here, a group of downlink reference signals includes a plurality of downlink reference signals transmitted using the eNB beams included in a corresponding group of eNB beams. A group of downlink reference signals transmitted using a group of eNB beams is hereinafter also referred to as a group of BF DL RSs, and each downlink reference signal is also referred to as a BF DL RS. Tire BF DL RS may be, for example, the beam-formed CSI-RS described above. It is desirable that a plurality of groups of BF DL RSs can be observed as received waves coming in different direction for the UE 200. This is to improve resistance to blocking. Specifically, since a plurality of groups of BF DL RSs are provided m different directions (or the UE 200, the eNB 100 can continue beam tracking using other surviving beam paths even when some beam paths are lost due to a shielding object. For example, the eNB 100 can continue beam tracking using the beam path using the reflected wave even in a case in which the beam path using the direct wave is lost.

The eNB 100 selects a plurality of groups of eNB beams for transmitting a plurality of groups of downlink reference signals on the basis of the reception results of a plurality of BF UL RSs transmitted by the UE 200 using the UE beams directed in a plurality of direction. For example, the eNB 100 transmits a group of eNB beams in a direction corresponding to a plurality of received BF UL RSs, typically in an arrival direction. Accordingly, the eNB 100 can transmit a group of BF DL RSs using a group of eNB beams which come in a plurality of directions and are received by the UE 200 in a diversity manner.

Such beam selection will be specifically described with reference to FIGS. 21 and 22. First, as illustrated to FIG. 21, the UE 200 transmits BF UL RSs 41 and 42 in a plurality of directions in which a data signal is desired to receive from the eNB UK) in a diversity manner. Then, the eNB 100 selects a plurality of eNB beams directed in the arrival direction of the BF UL RS 41, and transmits a group of BF DL RSs 43 using the selected group of eNB beams. Similarly, the eNB 100 selects a plurality of eNB beams directed in the arrival direction of the BF UL RS 42, and transmits a group of BF DL RSs 44 using the selected group of eNB beams. Further, in FIG. 22, the UE 200 is not illustrated for the sake of simplicity.

The eNB 100 transmits each of a plurality of BF DL RSs included in a group of BF DL RSs using resources having the same time and frequency. Further, the eNB 100 spatially multiplexes the respective BF DL RSs included in a group of BF DL RSs and transmits a resulting signal (that is, using different eNB beams) Meanwhile, the eNB 100 transmits each of a plurality of groups of BF DL RSs using resources orthogonal to each other in terms of at least one of time or frequency. Accordingly, the UE 200 can distinguish each group of BF DL RSs on the basis of orthogonal resources in which the group of BF DL RSs is received.

Such resource usage will be described specifically with reference to FIG. 23. For example, as illustrated in FIG. 23, the eNB 100 transmits each of the BF DL RSs included in a group of BF DL RSs 43 illustrated in FIG. 22 using a resource 45 in common. Meanwhile, the eNB 100 transmits each of the BF DL RSs included in a group of BF DL RSs 44 illustrated in FIG. 22 using a resource 46 in common. The resources 45 and the resources 46 are orthogonal in a time direction.

(3) Report of Report Information

Figure 24:
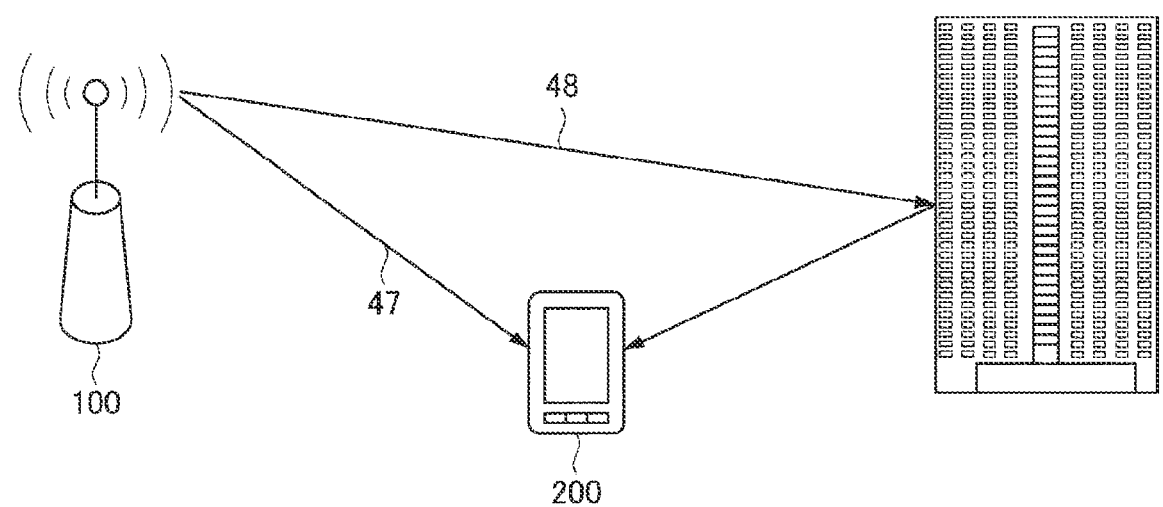
FIG. 24 is a diagram for describing a report of report information according to the present embodiment.

The report information for the downlink reference signal from the eNB 100 transmitted from the UE 200 will lie described below with reference to FIG. 24. FIG. 24 is a diagram for describing a report of the report information according to the present embodiment.

The UE 200 (for example, the communication control unit 243) reports information indicating the reception results of a plurality of groups of BF DL RSs transmitted using a plurality of groups of eNB beams selected in accordance with the reception results of a plurality of BF UL RSs by the eNB UK) to the eNB 100. For example, the UE 200 reports information indicating reception results of a first group of BF DL RSs and information indicating reception results of a second group of BF DL RSs to the eNB 100. The reported information may be the first report information or the second report information described above. For example, the information to be reported may include information (that is, identification information; typically, a beam ID) indicating eNB beams selected from each of a plurality of groups of eNB beams used for transmitting a plurality of groups of BF DL RSs. For example, the UE 200 may report information indicating first eNB beams selected from the first group of eNB beams used for transmitting the first group of BF DL RSs. Further, the UE 200 may report information indicating second eNB beams selected from the second group of eNB beams used for transmitting the second group of BF DL RSs. Accordingly; u is possible for the UE 200 to teed information indicating a plurality of appropriate eNB beams which are directed toward itself and come in different directions for the UE 200 back to the eNB 100.

Then, the eNB 100 (for example, the communication control unit 153) selects the eNB beams for transmitting the user data to the UE 200 from each of a plurality of groups of eNB beams used for transmitting a plurality of groups of BF DL RSs on the basis of the information indicating the reception results of a plurality of BF DL RSs in the UE 200 which are reported from the UE 200. For example, the eNB 100 selects a plurality of eNB beams indicated by a plurality of pieces of identification information fed back from the UE 200, and transmits a data signal including the user data using a plurality of eNB beams. Accordingly, the UE 200 can receive the data signal in different directions for the UE 200. At this time, the eNB 100 transmits the same user data to the UE 200 using a plurality of selected eNB beams. Accordingly, it is possible to acquire a diversity gain in a spatial direction. In other words, even in a case in which some beam paths are suddenly lost, the UE 200 can continuously receive the user data from other surviving beam paths, and thus it is possible to reduce a probability of communication interruption.

Such transmission of the user data using a plurality of beam paths will be specifically described with reference to FIG. 24. For example, as illustrated in FIG. 24, the eNB 100 transmits a data signal 47 using the eNB beams included in a group of eNB beams used for transmitting the group of BF DL RSs 43 selected on the basis of the information indicating the reception results of the group of BE DL RSs 43 illustrated in FIG. 22 which are reported from the UE 200. Further, the eNB 100 transmits a data signal 48 using the eNB beams included in a group of eNB beams used for transmitting the group of BF DL RSs 44 selected on the basis of the information indicating the reception results of the group of BF DL RSs 44 illustrated in FIG. 22 which are reported from the UE 200.

(4) Flow of Process

A flow of a series of processes described above wall be described with reference to FIG. 25.

Figure 25:
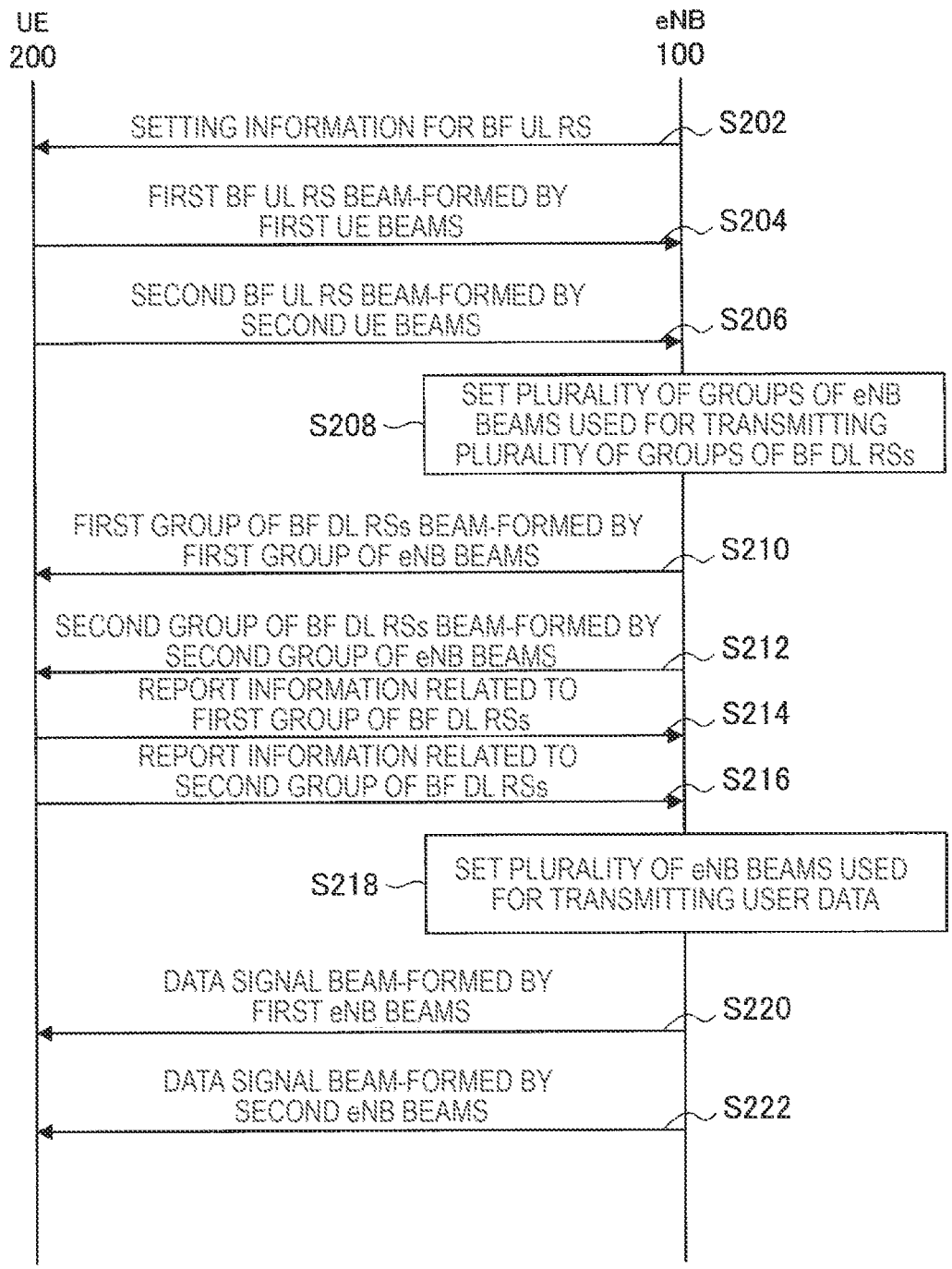
FIG. 25 is a sequence diagram illustrating an example of a flow of a communication process executed in a system according to the present embodiment.

FIG. 25 is a sequence diagram illustrating an example of a flow of a communication process executed in system 1 according to the present embodiment. As illustrated in FIG. 25, the eNB 100 and the UE 200 are involved in the present sequence. Further in the present sequence, art example in which the BF UL RS is transmitted in two directions will be described. Of course, the number of directions in which transmission is performed is arbitrary.

As illustrated in FIG. 25, the eNB 100 first transmits the setting information for the BF UL RS to the UE 200 (step S202). The selling information may include information indicating the UE beams to be used for transmitting the BF UL RS, information indicating resources to be used, the transmission period, and the like.

Then, the UE 200 transmits the first BE UL RS beam-formed by the first UE beams to the eNB 100 (step S204). Further, the UE 200 transmits the second BF UL RS beam-formed by the second UE beams to the eNB 100 (step S206).

Then, the eNB 100 sets a plurality of groups of eNB beams to be used for transmitting a group of BF DL RSs (step S208). For example, the eNB 100 selects a first group of eNB beams corresponding to the first BF UL RS and a second group of eNB beams corresponding to the second BF UL RS.

Then, the eNB 100 transmits a first group of beam-formed BF DL RSs to the UE 200 in accordance with the selected first group of eNB beams (step S210). Further, the eNB 100 transmits a second group of beam-formed BF DL RSs to the UE 200 in accordance with the selected second group of eNB beams (step S212).

Then, the UE 200 transmits the report information related to the first group of BF DL RSs to the eNB 100 as information indicating the reception results of the first group of BF DL RSs (step S214). Further, the UE 200 transmits the report information related to the second group of BF DL RSs to the eNB 100 as information indicating the reception results of the second group of BF DL RSs (step S216).

Then, the eNB 100 sets a plurality of eNB beams to be used for transmitting the user data (step S218). For example, the eNB 100 selects the first eNB beams included in the first group of eNB beams on the basis of the information indicating the reception results of the first group of BF DL RSs. Further, the eNB 100 selects the second eNB beams included in the second group of eNB beams on the basis of the information indicating the reception results of the second group of BF DL RSs. Then, the eNB 100 forms beams through the selected first eNB beams and transmits the data signal including the user data to the UE 200 (step S220). Further, the eNB 100 forms beams through the selected second eNB beams and transmits the data signal including the user data to the UE 200 (step S222).

5.3. Modified Example

Overview in a case in which the UE transmits a non-directional UL RS to the eNB, the eNB can receive the UL RS even when, for example, a shielding object enters between the UE and the eNB, and so blocking occurs. Therefore, in a case in which reciprocity is established between UL and DL due to adoption of TDD, and in a case in which the UE continuously transmits a non-directions UL RS to the eNB at a high frequency, the eNB can continuously provide appropriate eNB beams to the UE on the basis of the reception result of the UL RS.

However, since the transmission of the non-directional UL RS at a high frequency means an increase in a proportion of the UL RS in UL resources, it causes an increase in the UL overhead and a decrease in the throughput, in this regard, in the present embodiment, as described above, the UE 200 transmits a plurality of BF UL RSs. Accordingly, since the transmission frequency of UL RS is reduced, it is possible to avoid or reduce the increase in the UL overhead and the decrease in the throughput.

However, the method of transmitting the non-directional UL RS at a high frequency is effective as a countermeasure against blocking. In this regard, in foe present modified example, a technique in which the method for transmitting the non-directional UL RS at a high frequency is improved is provided.

Technical Features

Technical feature of the present modified example will be described below.

As described above, the UE 200 transmits a plurality of BF UL RSs in different directions. Further, the eNB 100 selects a plurality of groups of eNB beams on the basis of the reception results of a plurality of BF UL RSs and transmits a plurality of groups of BF DL RSs as described above. Then, the UE 200 feeds the information indicating the reception results of a plurality of groups of BF DL RSs back to the eNB 100 as described above.

In the above example, the information indicating the reception results of a plurality of groups of BF DL RSs to be fed back includes the information indicating the appropriate eNB beams selected from each of a plurality of groups of eNB beams used for transmitting a plurality of groups of BF DL RSs.

On the other hand, in the present modified example, the information indicating the reception results of a plurality of groups of BF DL RSs includes information indicating reception qualities of a group of BF DL RSs. For example, the information indicating the reception qualities may be information indicating that the reception quality is poor, that is, information indicating a group of eNB beams m which blocking is occurring or is likely to occur. In other words, the feedback is not one for giving a notification indicating undesired eNB beams if it is not one for giving a notification indicating desired eNB beam candidates but one for give a notification indicating that blocking is occurring or is likely to occur which is given to the eNB 100. To this end, the UE 200 (for example, the communication control unit 243) specifies a group of eNB beams in which blocking is occurring or is likely to occur, on the basis of the reception results of a plurality of groups of BF DL RSs. Then, the UE 200 feeds information indicating the specified group of eNB beams back to the eNB 100. Further, the reception quality here may be, for example, the reception power. Hereinafter, the information indicating a group of eNB beams in which blocking is occurring or is likely to occur is also referred to as blocking information.

Further, identification of a group of eNB beams that are likely to be blocked or likely to occur may be performed in the eNB 100. In this case, the eNB 100 includes information indicating the reception quality of each of the plurality of groups of BF DL RSs.

The eNB 100 (for example, the communication control unit 153) may change a plurality of groups of eNB beams to be used for transmitting a plurality of groups of BF DL RSs on the basis of information (typically, the blocking information) indicating the reception qualities of a group of BF DL RSs. Accordingly, the eNB 100 can stop the use of a group of eNB beams in which blocking is occurring or is likely to occur and perform switching to another group of eNB beams. Therefore, it is possible to prevent the occurrence of blocking in advance or to eliminate blocking promptly after blocking occurs.

In order for the eNB 100 to switch a group of eNB beams, it is desirable that a group of eNB beams to be switched is prepared in advance. For example, the eNB 100 prepares a plurality of groups of eNB beams in advance, transmits a group of BF DL RSs using some of a plurality of groups of eNB beams, and switches a group of eNB beams to be used in accordance with the feedback. A flow of such a process will be specifically described with reference to FIG. 20.

Figure 26:
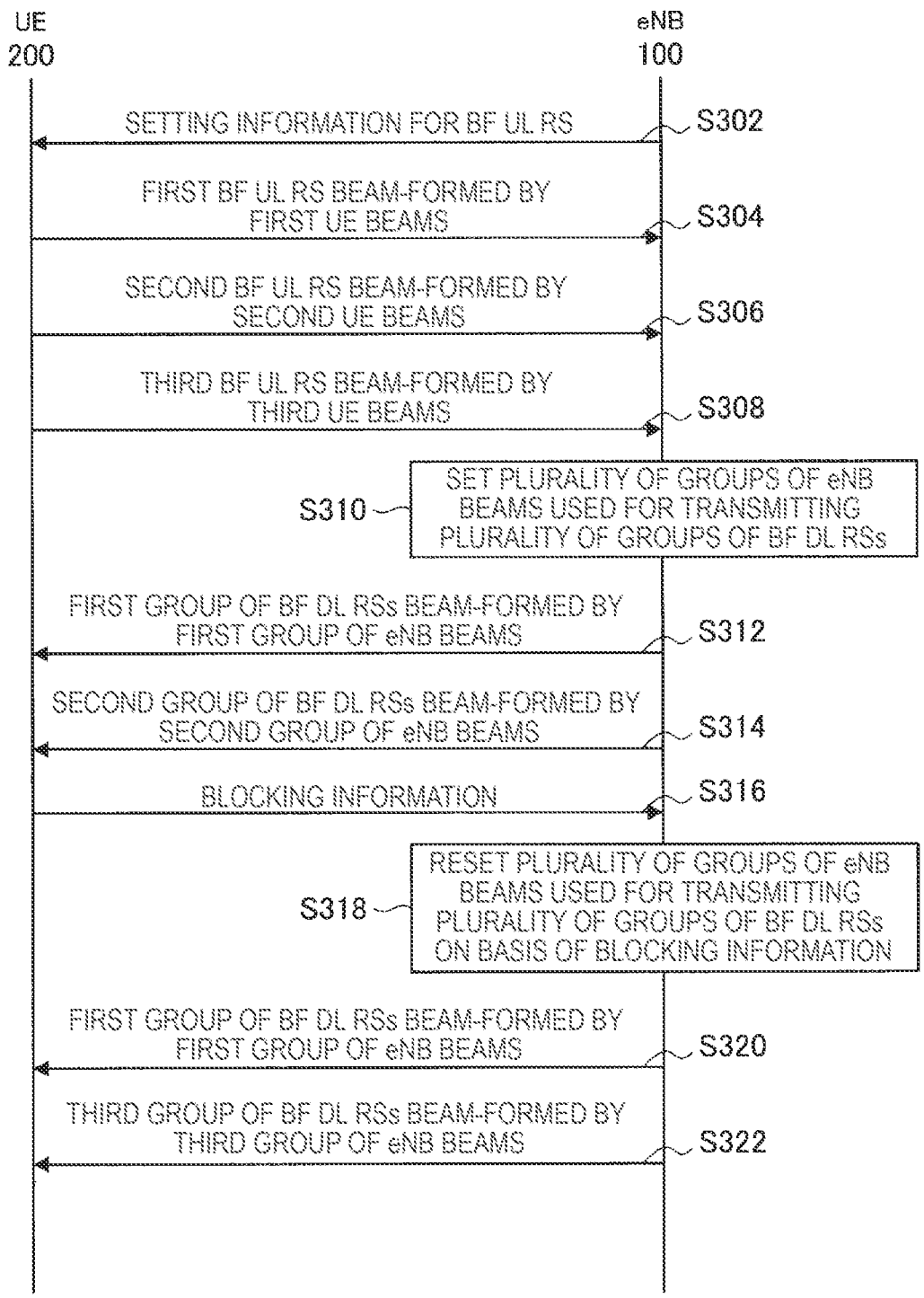
FIG. 26 is a sequence diagram illustrating an example of a flow of a communication process executed in a system according to a modified example of the present embodiment.

FIG. 26 is a sequence diagram illustrating an example of a flow of a communication process executed in the system 1 in accordance with the present modified example. As illustrated in FIG. 26, the eNB lot) and the UE 200 are involved in the present sequence. Further, in the present sequence, an example in which the BF UL RS is transmitted in three directions, and a group of BF DL RSs are transmitted in two directions will be described. Of course, the number of directions in which transmission is performed is arbitrary.

As illustrated in FIG. 26, the eNB 100 first transmits the setting information for the BF UL RS to the UE 200 (step S302). The setting information may include information indicating the UE beams to be used for transmitting the BF UL RS, information indicating resources to be used, the transmission period, and the like.

Then, the UE 200 transmits the first BF UL RS beam-formed by the first UE beams to the eNB 100 (step S304). Further, the UE 200 transmits the second BF UL RS beam-formed by the second UE beams to the eNB 100 (step S306). Further, the UE 200 transmits a beam-formed thud BF UL RS to the eNB 100 through third UE beams (step S308).

Then, the eNB 100 sets a plurality of groups of eNB beams to be used for transmitting a group of BF DL RSs (step S310). For example, the eNB 100 selects a first group of eNB beams corresponding to the first BF UL RS and a second group of eNB beams corresponding to the second BF UL RS.

Then, the eNB 100 transmits a first group of beam-formed BF DL RSs to the UE 200 in accordance with the selected first group of eNB beams (step S312). Further, the eNB 100 transmits a second group of beam-formed BF DL RSs to the UE 200 in accordance with the selected second group of eNB beams (step S314).

Then, the UE 200 transmits the blocking information to the eNB 100 as information indicating the reception results of a plurality of groups of received BF DL RSs (step S316). The blocking information includes, for example, information indicating that blocking is occurring or is likely to occur in the second group of eNB beams.

Then, the eNB 100 resets a plurality of groups of eNB beams to be used for transmitting a group of BF UL RSs on the basis of the blocking information (step S318). For example, the eNB 100 reselects the first group of eNB beams as a group of eNB beams to be used for transmitting a plurality of groups of BF UL RSs and further selects the third group of eNB beams instead of the second group of eNB beams.

Then, the eNB 100 transmits a first group of beam-formed BF DL RSs to the UE 200 in accordance with the selected first group of eNB beams (step S320). Further, the eNB 100 transmits a third group of beam-formed BF DL RSs to the UE 200 in accordance with the selected third group of eNB beams (step S322).

6. Application Examples

The technology according to the present disclosure is applicable to a variety of products. For example, a base station 100 may be realized as any type of evolved Node B (eNB) such as a macro eNB, and a small eNB. A small eNB may be an eNB that covers a cell smaller than a macro cell, such as a pico eNB, micro eNB, or home (femto) eNB. Instead, the base station 100 may be realized as any other types of base stations such as a NodeB and a base transceiver station (BTS). The base station 100 may include a main body (that is also referred to as a base station apparatus) configured to control radio communication, and one or more remote radio heads (RRH) disposed in a different place from the main body Additionally, various types of terminals to be discussed later may also operate as the base station 100 by temporarily or semi-permanently executing a base station function.

For example, a terminal apparatus 200 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The terminal apparatus 200 may also be realized as a terminal (that is also referred to as a machine type communication (MTC) terminal) that performs machine-to-machine (M2M) communication. Furthermore, the terminal apparatus 200 may be a radio communication module (such as an integrated circuit module including a single the) mounted on each of the terminals.

6-1. Application Examples Regarding Base Station

First Application Example

Figure 27:
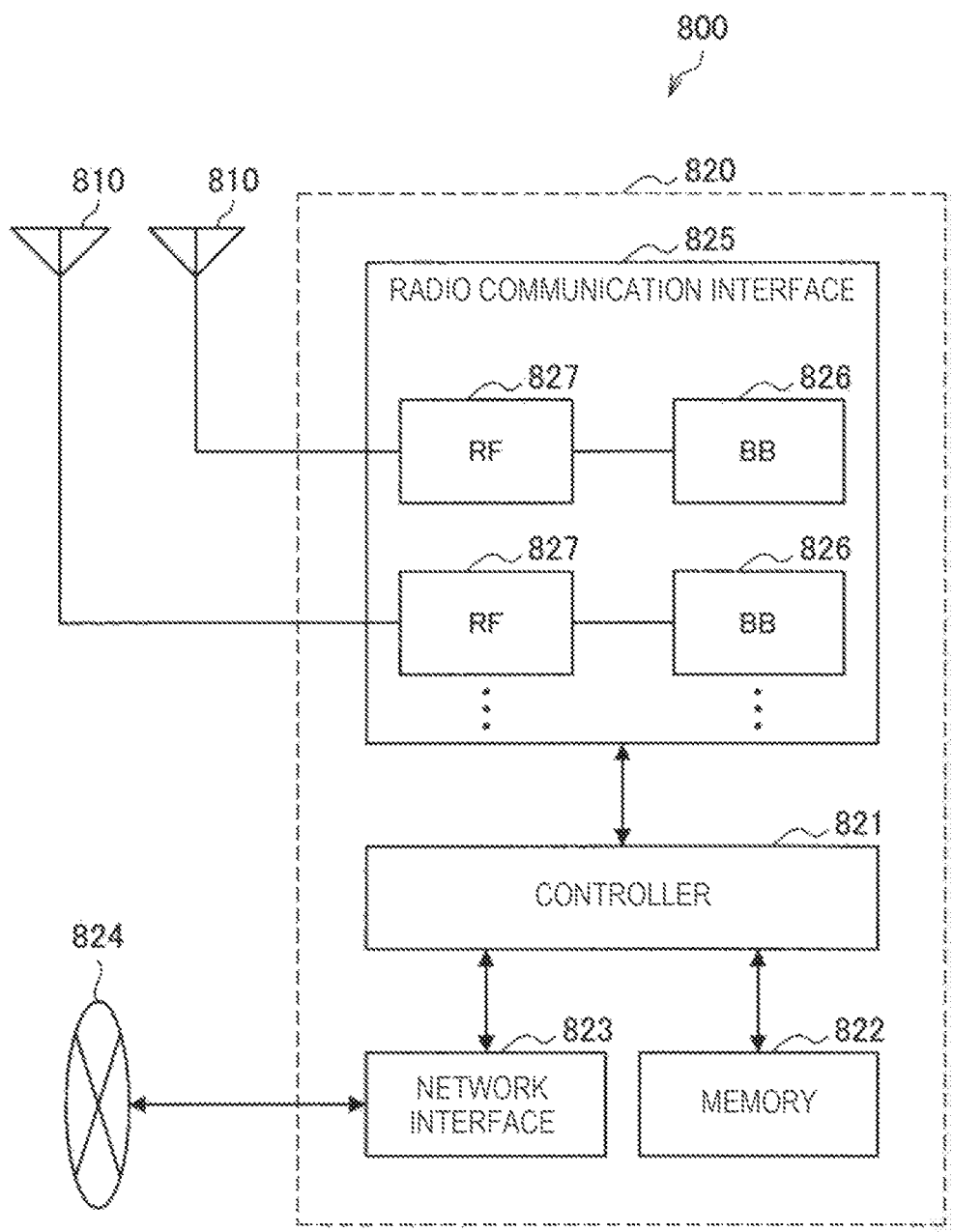
FIG. 27 is a block diagram illustrating a first example of a schematic configuration of an eNB.

FIG. 27 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RE cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 27. For example, the multiple antennas 810 may be compatible with multiple frequency bands used by the eNB 800. Although FIG. 27 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may Ire, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interlace 823. In that case, the eNB 800, and the core network node or the other eNB may be connected to each other through a logical interface (such as an S interface and an X2 interface). The network interface 823 may also be a wired communication interface or a radio communication interface for radio backhaul. If the network interlace 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding-decoding, modulating/demodulating, and multiplexing/demultiplexing, and performs various types of signal processing of Layers (such as L1, medium access control (MAC), radio link control (RLC), and a packet data convergence protocol (PDCP)). The BB processor 826 may have a part or all of the above-described logical functions instead of the controller 821. Tire BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 27. For example, the multiple BB processors 826 may be compatible with multiple frequency bands used by the eNB 800. The radio communication interface 825 may include the multiple RF circuits 827, as illustrated in FIG. 27. For example, the multiple RF circuits 827 may be compatible with multiple antenna elements. Although FIG. 27 illustrates the example in which the radio communication interface 825 includes the multiple BB processors 826 and the multiple RF circuits 827, the radio communication interface 825 may also include a single BB processor 826 or a single RF circuit 827.

In the eNB 800 shown in FIG. 27, one or more components (the setting unit 151 and/or the communication control unit 153) included in the control unit 150 or 250 described with reference to FIG. 7 may be mounted in the radio communication interlace 825. Alternatively, at least some of such components may Ire mounted in the controller 821. As an example, in the eNB 800, a module including a part (for example, the BB processor 826) or all of the radio communication interface 825 and/or the controller 821 is installed and the one or more components may be mounted in the module. In this case, the module may store a program causing a processor to function as the one or more components fin other words, a program causing a processor to execute operations of the one or more components) and execute the program. As another example, a program causing a processor to function as the one or more components is installed in the eNB 800, and the radio communication interface 825 (for example, the BB processor 826) and/or the controller 821 may execute the program. As described above, the eNB 800, the base station apparatus 820 or the module may be provided as an apparatus including the one or more components, and a program causing a processor to function as the one or more components may be provided. In addition, a readable recording medium recording the program may be provided.

In addition, the radio communication unit 120 described with reference to FIG. 7 may be mounted in the radio communication interface 825 (for example, the RF circuit 827) in the eNB 800 shown in FIG. 27. In addition, the antenna unit 110 may be mounted in the antenna 810. In addition, the network communication unit 130 may be mounted in the controller 821 and/or the network interface 823. In addition, the storage unit 140 may be mounted in the memory 822.

Second Application Example

Figure 28:
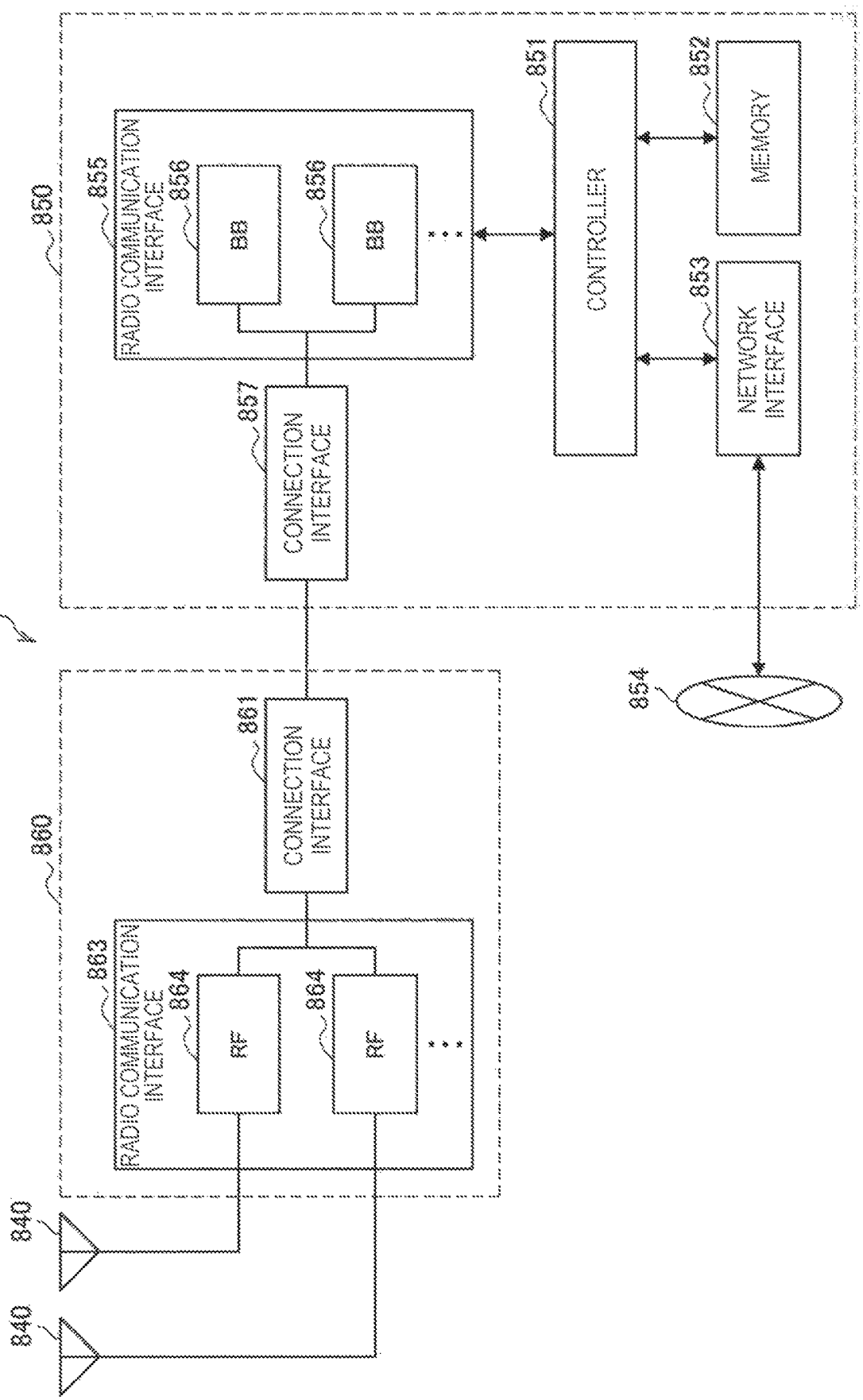
FIG. 28 is a block diagram illustrating a second example of a schematic configuration of an eNB.

FIG. 28 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 28. For example, the multiple antennas 840 may be compatible with multiple frequency bands used by the eNB 830. Although FIG. 28 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 27.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interlace 855 may typically include, for example, a BB processor 856. The BB processor 856 is the same as the BB processor 826 described with reference to FIG. 27, except the BB processor 856 is connected to the RF circuit 864 of the RRH 860 via the connection interlace 857. The radio communication interface 855 may include the multiple BB processors 856, as illustrated in FIG. 28. For example, the multiple BB processors 856 may be compatible with multiple frequency bands used by the eNB 830. Although FIG. 28 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interlace 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 28. For example, the multiple RF circuits 864 may support multiple antenna elements. Although FIG. 28 illustrates the example in which the radio communication interface 863 includes the multiple RF circuits 864, the radio communication interface 863 may also include a single RF circuit 864.

In the eNB 830 shown in FIG. 28, one or more components (the setting unit 151 and/or the communication control unit 153) included in the control unit described with reference to FIG. 7 may be mounted in the radio communication interlace 855 and/or the radio communication interface 863. Alternatively, at least some of such components may be mounted in the controller 851. As an example, in the eNB 830, a module including a part (for example, the BB processor 856) or all of the radio communication interface 855 and/or the controller 851 is installed and the one or more components may be mounted in the module. In this case, the module may store a program causing a processor to function as the one or more components (in other words, a program causing a processor to execute operations of the one or more components) and execute the program. As another example, a program causing a processor to function as the one or more components is installed in the eNB 830, and the radio communication interface 855 (for example, the BB processor 856) and/or the controller 851 may execute the program. As described above, the eNB 830, the base station apparatus 850 or the module may be provided as an apparatus including the one or more components, and a program causing a processor to function as the one or more components may be provided. In addition, a readable recording medium recording the program may be provided.

In addition, for example, the radio communication unit 120 described with reference to FIG. 7 may be mounted in the radio communication interface 863 (for example the RF circuit 864) in the eNB 830 shown in FIG. 28. In addition, the antenna unit 110 may be mounted in the antenna 840. In addition, the network communication unit 130 may be mounted in the controller 851 and/or the network interface 853. In addition, the storage unit 140 may be mounted in the memory 852.

6.2. Application Examples Regarding Terminal Apparatus

First Application Example

Figure 29:
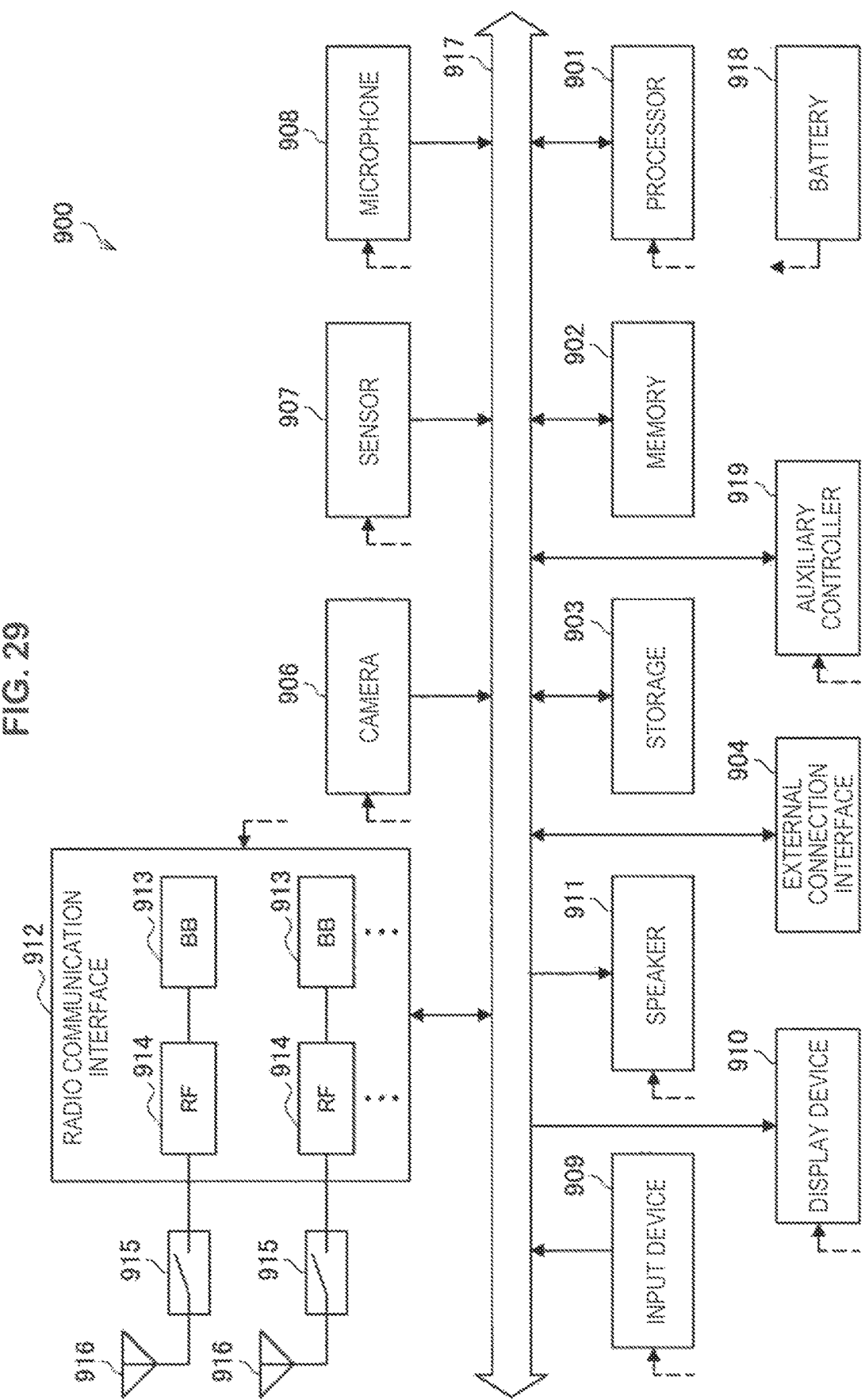
FIG. 29 is a block diagram illustrating an example of a schematic configuration of a smartphone.

FIG. 29 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interlace 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 29. Although FIG. 29 illustrates the example in which the radio communication interface 912 includes the multiple BB processors 913 and the multiple RF circuits 914, the radio communication interface 912 may also include a single BB processor 93 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 29. Although FIG. 29 illustrates the example in which the smartphone 900 includes the multiple antennas 916, the smartphone 900 may also include a single antenna 916.

Furthermore, the smartphone 900 may include the antenna 916 for each radio communication scheme, in that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 29 via feeder lines, which are partially shown as dashed lines in the figure. The auxiliary controller 919 operates a minimum necessary function of the smartphone 900, for example, in a sleep mode.

In the smartphone 900 shown in FIG. 29, one or more components (the setting unit 241 and/or the communication control unit 243) included in the control unit 240 described with reference to FIG. 8 may be mounted in the radio communication interface 912. Alternatively, at least some of such components may be mounted in the processor 901 or the auxiliary controller 919. As an example, in the smartphone 900, a module including a part (for example, the BB processor 913) or all of the radio communication interlace 912, the processor 901, and/or the auxiliary controller 919 is installed and the one or more components may be mounted in the module. In this case, the module may store a program causing a processor to function as the one or more components (in other words, a program causing a processor to execute operations of the one or more components) and execute the program. As another example, a program causing a processor to function as the one or more components is installed in the smartphone 900, and the radio communication interface 912 (for example, the BB processor 913), the processor 901, and/or the auxiliary controller 919 may execute the program. As described above, the smartphone 909, or the module may be provided as an apparatus including the one or more components, and a program causing a processor to function as the one or more components may be provided. In addition, a readable recording medium recording the program may be provided.

In addition, for example, the radio communication unit 220 described with reference to FIG. 8 may be mounted in the radio communication interface 912 (for example the RF circuit 914; in the smartphone 900 shown in FIG. 29. In addition, the antenna unit 210 may be mounted in the antenna 916. In addition, the storage unit 230 may be mounted in the memory 992.

Second Application Example

Figure 30:
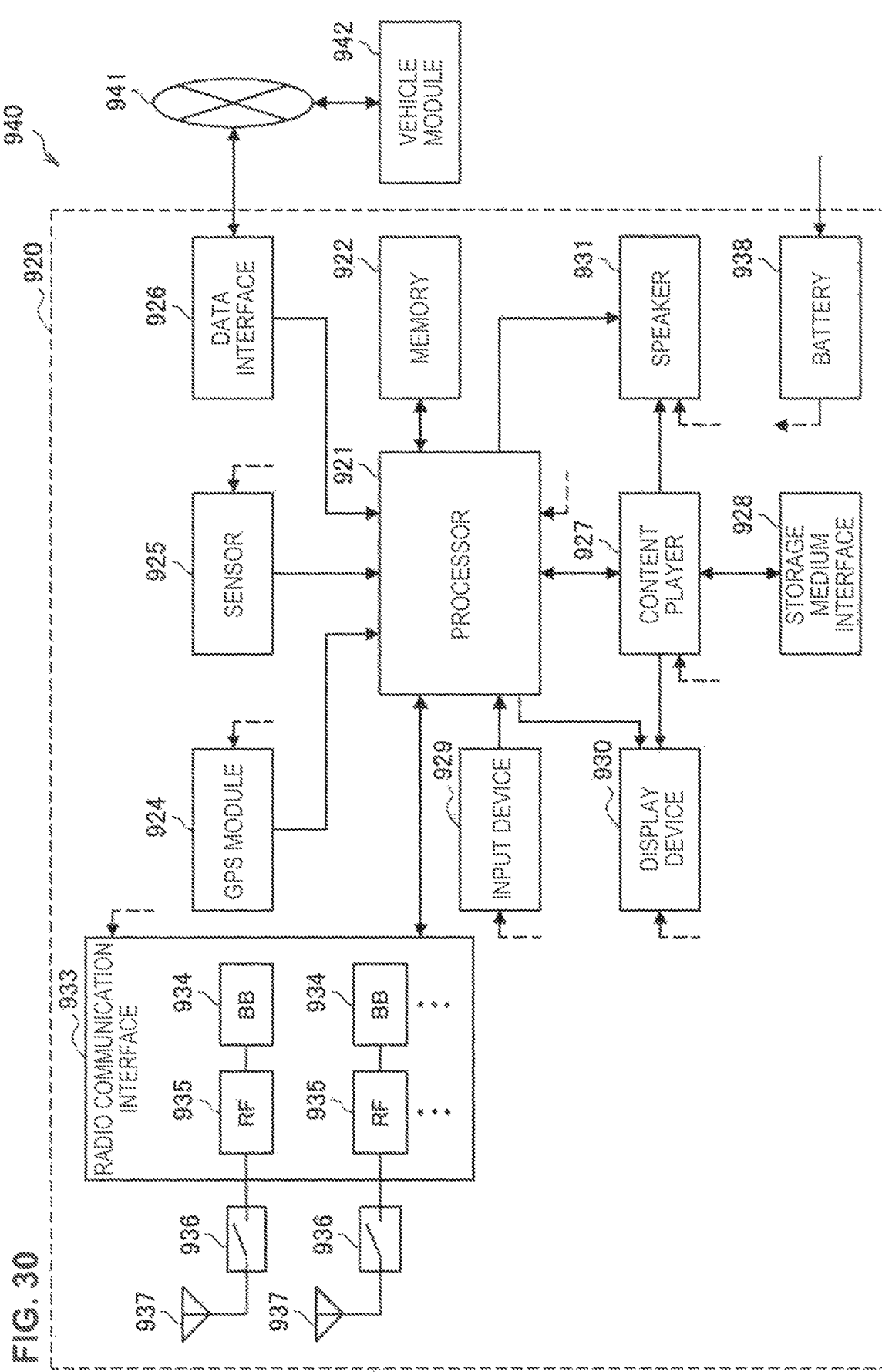
FIG. 30 is a block diagram illustrating an example of a schematic configuration of a car navigation apparatus.

FIG. 30 is a block diagram illustrating an example of a schematic configuration of a car navigation apparatus 920 to which the technology of the present disclosure may be applied. Tire car navigation apparatus 920 includes a processor 921, a memory 922, a global positioning system (GPS) module 924, a sensor 925, a data interface 926, a content player 927, a storage medium interface 928, art input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the ear navigation apparatus 920. Tire memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as an LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced. and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 30. Although FIG. 30 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 30. Although FIG. 30 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in HQ. 30 via feeder lines that are partially shown as dashed lines in the future. The battery 938 accumulates power supplied from the vehicle.

In the cut navigation apparatus 920 shown in FIG. 30, one or more components (the setting unit 241 and/or the communication control unit 243) included in the control unit 240 described with reference to FIG. 8 may be mounted in the radio communication interface 933. Alternatively, at least some of such components may be mounted in the processor 921. As an example, in the car navigation apparatus 920, a module including a part (for example, the BB processor 934) or all of the radio communication interface 933, and/or the processor 921 is installed and the one or more components may be mounted in the module. In this case, the module may store a program causing a processor to function as the one or more components (in other words, a program causing a processor to execute operations of the one or more components; and execute the program. As another example, a program causing a processor to function as the one or more components is installed in the ear navigation apparatus 920, and the radio communication interface 933 (for example, the BB processor 934), and/or the processor 921 may execute the program. As described above, the car navigation apparatus 920, or the module may be provided as an apparatus including the one or more components and a program causing a processor to function as the one or more components may be provided. In addition, a readable recording medium recording the program may be provided.

In addition, for example, the radio communication unit 220 described with reference to FIG. 8 may be mounted in the radio communication interface 933 (for example, the RF circuit 935) in the car navigation apparatus 920 shown in FIG. 30. In addition, the antenna unit 210 may be mounted in the antenna 937. In addition, the storage unit 230 may be mounted in the memory 922.

The technology of the present disclosure may also be realized as an in-vehicle system for a vehicle) 940 including one or more blocks of the car navigation apparatus 920, the in-vehicle network 941 and a vehicle module 942. The vehicle module 942 generates vehicle data such as vehicle speed, engine speed, and trouble information, and outputs the generated data to the in-vehicle network 941.

7. Conclusion

One embodiment of the present disclosure has been described above in detail with reference to FIGS. 1 to 30. As described above, according to the first embodiment, the UE 200 communicates with the eNB 100 that forms a plurality of beams and performs communication, and reports the first report information for the downlink user data related to the reception results of a group of BF DL RSs transmitted from the eNB 100 and the second report information for beam tracking intended for the UE 200 by the eNB 100 to the eNB 100. Accordingly, the eNB 100 can appropriately select beams to be used for transmitting the user data and appropriately determine whether or not beam tracking is going well. As described above, since the eNB 100 appropriately determines whether or not beam tracking is going well, the accuracy of beam tracking is improved, and the continuity of beam tracking is improved accordingly.

Further, according to the second embodiment, the UE 200 forms a plurality of beams and performs communication with the eNB 100, and transmits a plurality of BF UL RSs using beams directed in different directions. Then, on the basis of the reception results of a plurality of BF UL RSs, the eNB 100 transmits each of a plurality of groups of BF RL RSs using a group of beams which come in different directions for the UE 200 and pass through each of a plurality of paths. Therefore, for example, eve in a case in which some of the beam paths are lost, the eNB 100 can continue beam tracking using other surviving beam paths. As described above, since the resistance to blocking is improved, and the continuity of beam tracking is improved accordingly.

The preferred embodiment(s) of the present disclosure ha shave been described above with reference to the accompanying drawings, whilst the present disclosure is not limited to the above examples. A person skilled in the art may find various alterations and modifications within the scope of the appended claims, and it should be understood that they will naturally come under the technical scope of foe present disclosure.

For example, the techniques described above may be appropriately combined. For example, the embodiments described above may be combined.

Note that it is not necessary for the processing described in this specification with reference to the flowchart to be executed in the order shown in the flowchart. Some processing steps may be performed in parallel. Farther, some of additional steps can be adopted, or some processing steps can be omitted.

In addition, the effects described in the present specification are merely illustrative and demonstrative, and not limitative. In other words, the technology according to the present disclosure can exhibit other effects dial are evident to those skilled in fee art along wife or instead of fee effects based on the present specification.

Additionally, the present technology may also be configured as below.

(1)

A terminal apparatus, including:

a communication unit configured to perform communication with a base station configured to form a plurality of beams and perform communication; and a control unit configured to report first report information for downlink user data related to reception results of a group of downlink reference signals including a plurality of downlink reference signals transmitted from the base station using the beams and second report information for beam tracking intended for the terminal apparatus by the base station to the base station.

(2)

The terminal apparatus according to (1), in which the first report information includes information indicating the reception results of the group of downlink reference signals in which interference is considered, and fee second report information includes information indicating the reception results of fee group of downlink reference signals in which interference is not considered.

(3)

The terminal apparatus according to (2), in which the second report information includes information indicating beams having a highest receiving power among a group of beams used for transmitting the group of downlink reference signals.

(4)

The terminal apparatus according to (2) or (3), in which the second report information includes information indicating whether or not beam tracking by the base station is appropriate.

(5)

The terminal apparatus according to any one of (2) to (4), in which the control unit transmits an uplink reference signal for the beam tracking by the base station, and the second report information includes information for requesting a change in a transmission period of the uplink reference signal.

(6)

The terminal apparatus according to any one of (2) to (5), in which the second report information includes information for requesting a change in the number of downlink reference signals included in the group of downlink reference signals.

(7)

The terminal apparatus according to any one of (2) to (6), in which the second report information includes information for requesting a change in a transmission period of the group of downlink reference signals.

(8)

The terminal apparatus according to any one of (1) to (7), in which the control unit reports the first report information and the second report information as separate messages.

(9)

The terminal apparatus according to any one of (1) to (7), in which the control unit encodes the first report information and the second report information into one message and reports the message.

(10)

A base station, including:

a communication unit configured to form a plurality of beams and perform communication with a terminal apparatus; and a control unit configured to perform transmission of a group of downlink reference signals including a plurality of downlink reference signals transmitted using beams to the terminal apparatus, reception of first report information for downlink user data related to reception results of the group of downlink reference signals and second report information for beam tracking intended for the terminal apparatus from the terminal apparatus, a first transmission setting based on the first report information, and a second transmission setting based on the second report information.

(11)

The base station according to (10), in which the control unit selects beams to be used for transmitting user data to the terminal apparatus as the first transmission setting.

(12)

The base station according to (10) or (11), in which the control unit sets a transmission period of an uplink reference signal transmitted from the terminal apparatus as the second transmission setting.

(13)

The base station according to any one of (10) to (12), in which the control unit sets a transmission period of beams used for transmitting the group of downlink reference signals as the second transmission setting.

(14)

The base station according to any one of (10) to (13), in which the control unit sets the number of beams used for transmitting the group of downlink reference signals as the second transmission setting.

(15)

The base station according to any one of (10) to (14), in which the control unit sets beams to be used for transmitting the group of downlink reference signals as the second transmission setting.

(16)

The base station according to any one of (10) to (15). In which the control unit sets sharpness of beams used for transmitting the group of downlink reference signals as the second transmission selling.

(17)

A terminal apparatus, including:

a communication unit configured to form a plurality of beams and perform communication with a base station; and a control unit configured to transmit each of a plurality of uplink reference signals using beams directed in different directions.

(18)

The terminal apparatus according to (17), in winch the control unit reports information indicating reception results of a plurality of groups of downlink reference signals transmitted using each of a plurality of groups of beams selected in accordance with reception results of the plurality of uplink signals by the base station to the base station.

(19)

The terminal apparatus according to (18), in which the information indicating the reception results of the plurality of groups of downlink reference signals includes information indicating beams selected from each of the plurality of groups of beams used for transmitting the plurality of groups of downlink reference signals.

(20)

The terminal apparatus according to (18), in which the information indicating the reception results of the plurality of groups of downlink reference signals includes information indicating reception quality of the group of downlink reference signals.

(21)

The terminal apparatus according to any one of (17) to (20), in which the control unit transmits each of the plurality of uplink reference signals using resources orthogonal to each other in terms of at least one of tune, frequency; or a code.

(22)

The terminal apparatus according to any one of (17) to (21), in which the control unit transmits each of the plurality of uplink reference signals at different transmission periods.

(23)

A base station, including:

a communication unit configured to form a plurality of beams and perform communication with a terminal apparatus; and a control unit configured to transmit each of a plurality of groups of downlink reference signals using a group of beams which come in different directions for the terminal apparatus and pass through each of a plurality of paths.

(24)

The base station according to (23), in which the control unit selects a plurality of the groups of beams on the basis of reception results of a plurality of uplink reference signals transmitted by the terminal apparatus using beams directed in a plurality of directions.

(25)

The base station according to (23) or (24), in which the control unit transmits each of a plurality of downlink reference signals included in the group of downlink reference signals using resources having same time and frequency.

(26)

The base station according to any one of (23) to (25), in which the control unit transmits each of the plurality of groups of downlink reference signals using resources orthogonal to each oilier in terms of at least one of time or frequency.

(27)

The base station according to any one of (23) to (26), in which the control unit selects beams for transmitting user data to the terminal apparatus from each of a plurality of groups of beams used for transmitting the plurality of groups of downlink reference signals on the basis of information indicating reception results of the plurality of groups of downlink reference signals in the terminal apparatus.

(28)

The base station according to (27), in which the control unit transmits same user data to the terminal apparatus using a plurality of selected beams.

(29)

A method, including:

performing communication with a base station configured to form a plurality of beams and perform communication; and repotting, by a processor, first report information for downlink user data related to reception results of a group of downlink reference signals including a plurality of downlink reference signals transmitted from the base station using the beams and second report information for beam tracking intended for a terminal apparatus by the base station to the base station.

(30)

A recording medium having a program recorded thereon, the program causing a computer to function as:

a communication unit configured to perform communication with a base station configured to form a plurality of beams and perform communication, and a control unit configured to report first report information for downlink user data related to reception results of a group of downlink reference signals including a plurality of downlink reference signals transmitted from the base station using the beams and second report information for beam tracking intended for a terminal apparatus by the base station to the base station.

(31)

A method, including:

forming a plurality of beams and performing communication with a terminal apparatus; and performing, by a processor, transmission of a group of downlink reference signals including a plurality of downlink reference signals transmitted using beams to the terminal apparatus, reception of first report information for downlink user data related to reception results of the group of downlink reference signals and second report information for beam tracking intended for the terminal apparatus from the terminal apparatus, a first transmission setting based on the first report information, and a second transmission setting based on the second report information.

(32)

A recording medium having a program recorded thereon, the program causing a computer to function as:

a communication unit configured to form a plurality of beams and perform communication with a terminal apparatus; and a control unit configured to perform transmission of a group of downlink reference signals including a plurality of downlink reference signals transmitted using beams to the terminal apparatus, reception of first report information for downlink user data related to reception results of the group of downlink reference signals and second report information, for beam tracking intended for the terminal apparatus from the terminal apparatus, a first transmission setting based on the first report information, and a second transmission setting based on the second report information.

(33)

A method, including:

forming a plurality of beams and performing communication with a base station; and transmitting, by a processor, each of a plurality of uplink reference signals using beams directed in different directions.

(34)

A recording medium having a program recorded thereon, the program causing a computer to function as:

a communication unit configured to form a plurality of beams and perform communication with a base station; and a control unit configured to transmit each of a plurality of uplink reference signals using beams directed in different directions.

(35)

A method including:

forming a plurality of beams and performing communication with a terminal apparatus; and transmitting, by a processor, each of a plurality of groups of downlink reference signals using a group of beams which come in different directions for the terminal apparatus and pass through each of a plurality of paths.

(36)

A recording medium having a program recorded thereon, the program causing a computer to function as:

a communication unit configured to form a plurality of beams and perform communication with a terminal apparatus; and a control unit configured to transmit each of a plurality of groups of downlink reference signals using a group of beams which come in different directions for the terminal apparatus and pass through each of a plurality of paths.

REFERENCE SIGNS LIST 1 system
100 base station
110 antenna unit
120 radio communication unit
130 network communication unit
140 storage unit
150 control unit
151 setting unit
153 communication control unit
200 terminal apparatus
210 antenna unit
220 radio communication unit
230 storage unit
240 control unit
241 setting unit
243 communication control unit

The invention claimed is:

1. A terminal apparatus; comprising:

circuitry configured to perform communication with a base station configured to form a plurality of beams and perform communication; and report first report information for downlink user data related to reception results of a group of downlink reference signals including a plurality of downlink reference signals transmitted from the base station using the beams and second report information for beam tracking intended for the terminal apparatus by the base station to the base station, wherein the first report information includes information indicating the reception results of the group of downlink reference signals in which interference is considered, and the second report information includes information indicating the reception results of the group of downlink reference signals in which interference is not considered.

2. The terminal apparatus according to claim 1, wherein the second report information includes information indicating beams having a highest receiving power among a group of beams used for transmitting the group of downlink reference signals.

3. The terminal apparatus according to claim 1, wherein the second report information includes information indicating Whether or not beam tracking by the base station is appropriate.

4. The terminal apparatus according to claim 1, wherein the circuitry is configured to transmit an uplink reference signal for the beam tracking by the base station, and the second report information includes information for requesting a change in a transmission period of the uplink reference signal.

5. The terminal apparatus according to claim 1, wherein the second report information includes information for requesting a change in a number of downlink reference signals included in the group of downlink reference signals.

6. The terminal apparatus according to claim 1, wherein the second report information includes information for requesting a change in a transmission period of the group of downlink reference signals.

7. The terminal apparatus according to claim 1, wherein the circuitry is configured to report the first report information and the second report information as separate messages.

8. The terminal apparatus according to claim 1, wherein the circuitry is configured to encode the first report information and the second report information into one message and to report the message.

9. A base station, comprising:

circuitry configured to form a plurality of beams and perform communication with a terminal apparatus; and perform transmission of a group of downlink reference signals including a plurality of downlink reference signals transmitted using beams to the terminal apparatus, reception of first report information for downlink user data related to reception results of the group of downlink reference signals and second report information for beam tracking intended for the terminal apparatus from the terminal apparatus, a first transmission setting based on the first report information, and a second transmission setting based on the second report information, wherein the first report information includes information indicating the reception results of the group of downlink reference signals in which interference is considered, and the second report information includes information indicating the reception results of the group of downlink reference signals in which interference is not considered.

10. The base station according to claim 9, wherein the circuitry is configured to select beams to be used for transmitting user data to the terminal apparatus as the first transmission setting.

11. The base station according to claim 9, wherein the circuitry is configured to set a transmission period of an uplink reference signal transmitted from the terminal apparatus as the second transmission setting.

12. The base station according to claim 9, wherein the circuitry is configured to set a transmission period of beams used for transmitting the group of downlink reference signals as the second transmission setting.

13. The base station according to claim 9, wherein the circuitry is configured to set a number of beams used for transmitting the group of downlink reference signals as the second transmission setting.

14. The base station according to claim 9, wherein the circuitry is configured to set beams to be used for transmitting the group of downlink reference signals as the second transmission setting.

15. The base station according to claim 9, wherein the circuitry is configured to set sharpness of beams used for transmitting the group of downlink reference signals as the second transmission setting.

16. A method, comprising:
performing communication with a base station configured to form a plurality of beams and perform communication; and
reporting, by circuitry, first report information for downlink user data related to reception results of a group of downlink reference signals including a plurality of downlink reference signals transmitted from the base station using the beams and second report information for beam tracking intended for a terminal apparatus by the base station to the base station, wherein
the first report information includes information indicating the reception results of the group of downlink reference signals in which interference is considered, and
the second report information includes information indicating the reception results of the group of downlink reference signals in which interference is not considered.

17. A non-transitory tangible, computer-readable storage medium having a program recorded thereon, the program causing a computer to function as:
a communication unit configured to perform communication with a base station configured to form a plurality of beams and perform communication; and
a control unit configured to report first report information for downlink user data related to reception results of a group of downlink reference signals including a plurality of downlink reference signals transmitted from the base station using the beams and second report information for beam tracking intended for a terminal apparatus by the base station to the base station, wherein
the first report information includes information indicating the reception results of the group of downlink reference signals in which interference is considered, and
the second report information includes information indicating the reception results of the group of downlink reference signals in which interference is not considered.

18. A method; comprising:
forming a plurality of beams and performing communication with a terminal apparatus; and
performing, by circuitry, transmission of a group of downlink reference signals including a plurality of downlink reference signals transmitted using beams to the terminal apparatus, reception of first report information for downlink user data related to reception results of the group of downlink reference signals and second report information for beam tracking intended for the terminal apparatus from the terminal apparatus, a first transmission setting based on the first report information, and a second transmission setting based on the second report information, wherein
the first report information includes information indicating the reception results of the group of downlink reference signals in which interference is considered, and
the second report information includes information indicating the reception results of the group of downlink reference signals in which interference is not considered.

19. A non-transitory, tangible, computer-readable storage medium having a program recorded thereon, the program causing a computer to function as:
a communication unit configured to form a plurality of beams and perform communication with a terminal apparatus; and
a control unit configured to perform transmission of a group of downlink reference signals including a plurality of downlink reference signals transmitted using beams to the terminal apparatus, reception of first report information for downlink user data related to reception results of the group of downlink reference signals and second report information for beam tracking intended for the terminal apparatus from the terminal apparatus, a first transmission setting based on the first report information, and a second transmission setting based on the second report information, wherein
the first report information includes information indicating the reception results of the group of downlink reference signals in which interference is considered, and
the second report information includes information indicating the reception results of the group of downlink reference signals in which interference is not considered.

* * * * *